(12) United States Patent
Frank et al.

(10) Patent No.: US 11,215,509 B2
(45) Date of Patent: Jan. 4, 2022

(54) METHOD FOR DETERMINING A TEMPERATURE WITHOUT CONTACT, AND INFRARED MEASURING SYSTEM

(71) Applicant: Robert Bosch GmbH, Stuttgart (DE)

(72) Inventors: Michael Frank, Bretten (DE); Volkmar Senz, Metzingen (DE); Michael Badeja, Freiburg (DE); Axel Rumberg, Karlsruhe (DE); Michael Krueger, Reutlingen (DE); Helge Dittmer, Hamburg (DE)

(73) Assignee: Robert Bosch GmbH, Stuttgart (DE)

( * ) Notice: Subject to any disclaimer, the term of this patent is extended or adjusted under 35 U.S.C. 154(b) by 451 days.

(21) Appl. No.: 16/314,429

(22) PCT Filed: Jun. 14, 2017

(86) PCT No.: PCT/EP2017/064551
§ 371 (c)(1),
(2) Date: Dec. 30, 2018

(87) PCT Pub. No.: WO2018/001739
PCT Pub. Date: Jan. 4, 2018

(65) Prior Publication Data
US 2019/0154512 A1    May 23, 2019

(30) Foreign Application Priority Data
Jun. 30, 2016 (DE) .................... 10 2016 211 821.8

(51) Int. Cl.
*G01J 5/00* (2006.01)
*G01J 5/02* (2006.01)
(Continued)

(52) U.S. Cl.
CPC ............ *G01J 5/0265* (2013.01); *G01J 5/023* (2013.01); *G01J 5/024* (2013.01); *G01J 5/0245* (2013.01);
(Continued)

(58) Field of Classification Search
CPC .. G01J 5/049; G01J 5/0011; G01J 5/00; G01J 2005/0048; G01J 1/4228; G01J 2005/065;
(Continued)

(56) References Cited

U.S. PATENT DOCUMENTS 6,659,639 B2    12/2003  Hollander et al.
7,030,378 B2 *   4/2006  Allen .................... H01L 27/146
                                                    250/332

(Continued)

FOREIGN PATENT DOCUMENTS

CN    101802576 B    1/2013
CN    104412386 A    3/2015
(Continued)

OTHER PUBLICATIONS

International Search Report corresponding to PCT Application No. PCT/EP2017/064551, dated Sep. 19, 2017 (German and English language document) (7 pages).
(Continued)

*Primary Examiner* — Gail Kaplan Verbitsky
(74) *Attorney, Agent, or Firm* — Maginot, Moore & Beck LLP

(57) ABSTRACT

A method and an infrared measuring system for determining a temperature distribution of a surface without contact includes an infrared detector array with a detector array substrate and respective pluralities of measuring pixels and reference pixels. The measuring pixels are each connected to the detector array substrate with a first thermal conductivity, are sensitive to infrared radiation, and each provide a
(Continued)

measurement signal for determining a temperature measurement value that depends on the intensity of the incident infrared radiation. The reference pixels are each connected to the detector array substrate with a second thermal conductivity and each provide a measurement signal for determining a temperature measurement value. The reference pixels are implemented as blind pixels that are substantially insensitive to infrared radiation. The temperature measurement values of the measuring pixels are corrected by a pixel-associated temperature drift component determined with reference to the temperature measurement values of the reference pixels.

19 Claims, 16 Drawing Sheets

(51) Int. Cl.
 *G01J 5/06* (2006.01)
 *G01J 5/10* (2006.01)
 *G01J 5/20* (2006.01)
 *H04N 5/33* (2006.01)

(52) U.S. Cl.
 CPC ............. *G01J 5/06* (2013.01); *G01J 5/10* (2013.01); *G01J 5/20* (2013.01); *H04N 5/33* (2013.01); *G01J 2005/0077* (2013.01); *G01J 2005/066* (2013.01); *G01J 2005/202* (2013.01)

(58) Field of Classification Search
 CPC ........ G01J 5/0834; G01J 5/0265; G01J 5/023; G01J 5/024; G01J 5/06; G01J 5/10; G01J 5/20; G01J 2005/0077; G01J 2005/066; G01J 2005/202; G01K 13/20; G01K 13/223; A61B 5/6817; H04N 5/33
 See application file for complete search history.

(56) References Cited

U.S. PATENT DOCUMENTS

| | | | | |
|---|---|---|---|---|
| 7,422,365 | B2* | 9/2008 | Chamberlain | G01J 5/10 250/338.1 |
| 7,652,251 | B1 | 1/2010 | King | |
| 9,797,942 | B2* | 10/2017 | Engberg | G01J 5/522 |
| 9,936,106 | B2* | 4/2018 | Nazemi | H04N 5/2176 |
| 9,971,004 | B2* | 5/2018 | Kurtz | A61B 5/4381 |
| 2001/0040216 | A1 | 11/2001 | Knauth et al. | |
| 2005/0029453 | A1* | 2/2005 | Allen | H04N 5/3655 250/332 |
| 2006/0209358 | A1* | 9/2006 | Rogalski, Jr. | H04N 5/3651 358/468 |
| 2009/0302219 | A1 | 12/2009 | Johnson et al. | |
| 2009/0304042 | A1 | 12/2009 | Agronin | |
| 2010/0046577 | A1 | 2/2010 | Sheard et al. | |
| 2010/0193706 | A1* | 8/2010 | Shen | G01J 5/023 250/474.1 |
| 2011/0298931 | A1* | 12/2011 | Weisbach | H04N 5/33 348/162 |
| 2013/0248711 | A1* | 9/2013 | Lambkin | G01J 5/20 250/332 |
| 2015/0226613 | A1* | 8/2015 | Bauer | H04N 5/33 250/349 |
| 2016/0079293 | A1* | 3/2016 | Ishii | H01L 27/14649 250/338.4 |
| 2020/0124482 | A1* | 4/2020 | Revaux | G01J 5/048 |

FOREIGN PATENT DOCUMENTS

| | | |
|---|---|---|
| DE | 10 2008 041 750 A1 | 3/2010 |
| DE | 10 2012 208 220 A1 | 11/2013 |
| DE | 20 2013 008 745 U1 | 5/2014 |
| WO | 01/36926 A1 | 5/2001 |

OTHER PUBLICATIONS

Vidas et al.; Ad Hoc radiometric calibration of a thermal-infrared camera; 2013 International Conference on Digital Image Computing: Techniquesand Applications; Nov. 26, 2013; 8 Pages.

Riou et al.; Nonuniformity correction and thermal drift compensation of thermal infrared camera; SPIE Proceedings vol. 5405; Apr. 12, 2004; 9 Pages.

\* cited by examiner (d)

(a)

(b)

(a)

(b)

(a)

(b)

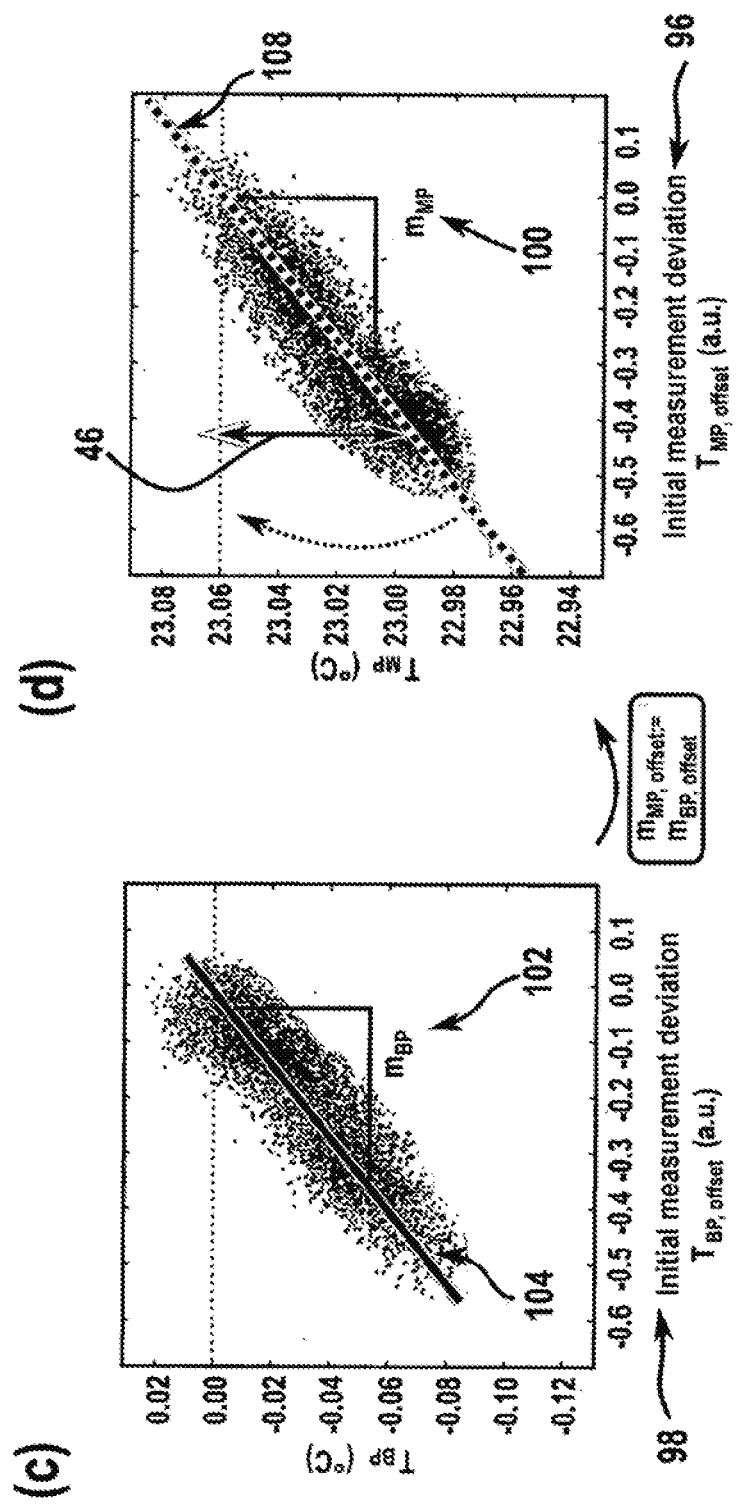

(a)

(b)

METHOD FOR DETERMINING A TEMPERATURE WITHOUT CONTACT, AND INFRARED MEASURING SYSTEM

This application is a 35 U.S.C. § 371 National Stage Application of PCT/EP2017/064551, filed on Jun. 14, 2017, which claims the benefit of priority to Serial No. DE 10 2016 211 821.8, filed on Jun. 30, 2016 in Germany, the disclosures of which are incorporated herein by reference in their entirety.

BACKGROUND

The invention relates to a method for contactlessly establishing a temperature of a surface, in particular for contactlessly establishing a temperature distribution on a surface, and a corresponding infrared measurement system.

Apparatuses and methods for contactlessly establishing a temperature of a surface, in particular for contactlessly establishing a temperature distribution on a surface, are known in the prior art and find use in many applications, for example for checking the safety of electronic circuits, for seeking defects in machine processes or for identifying insufficient thermal insulation within the scope of hot and/or cold insulation. Compared to conventional temperature measurement appliances, infrared thermometers have the advantage of contactless and fast measurements and can be used, in particular, if regions to be measured are only accessible with difficulties or not accessible at all. Here, the temperature measurement by means of an infrared-sensitive thermometer is based on the detection of thermal radiation, i.e., infrared radiation, in particular in a wavelength range between 3 µm and 50 µm, which is emitted by every object with a different intensity depending on the temperature, in particular the surface temperature, thereof. A surface temperature of the emitting body can be determined using the temperature measurement appliance on the basis of a measured intensity of the emitted thermal radiation.

Infrared thermometers known from the prior art can be essentially classified into two embodiments. Apparatuses of the first type, so-called spot thermometers, typically comprise an infrared sensor, a lens and a display and typically have a conical, preferably small measurement volume, from which thermal radiation is detected. U.S. Pat. No. 6,659,639 A1 and US 2009/0304042 A1 describe apparatuses and methods of a measurement appliance of this type.

Infrared thermometers of a second type, so-called thermal imaging cameras, by contrast typically have an infrared-sensitive image sensor, a lens system and a screen and allow the examination of an object in the infrared range of the radiation spectrum in a manner similar to a camera operating in the visual spectral range and allow output on the screen as a two-dimensional, color-coded image of the object. Apparatuses and methods of this second type are described by US 2009/0302219 A1 and U.S. Pat. No. 7,652,251 A1.

DE 20 2013 008 745 U1 has disclosed a thermal imaging camera with a sensor field having sensor pixels, in which a stop is arranged in the beam path of the thermal imaging camera, the projection and/or the shadow cast by said stop subdividing the sensor field into at least one shadowed region containing at least one sensor pixel and into at least one non-shadowed region. Use of a measurement and/or reference value established by the at least one shadowed sensor pixel allows an offset correction of the thermal imaging camera to be carried out without a shutter (closure element) that covers all sensor pixels at least intermittently.

Further, DE 10 2008 011 750 A1 has disclosed a microstructured reference pixel for sensors, said reference pixel changing an electric property in its value in temperature-dependent fashion and being thermally coupled to a substrate but electrically insulated from said substrate. A temperature to be measured is determined in a method for operating a temperature sensor using this reference pixel, with the reference pixel being used for referencing purposes.

SUMMARY

The invention proceeds from an infrared measurement system, in particular a handheld thermal imaging camera, for contactlessly establishing a temperature of a surface, in particular for contactlessly establishing a temperature distribution on a surface. According to the invention, the infrared measurement system has at least one infrared detector array with a detector array substrate, and with a plurality of measurement pixels, which are each connected to the detector array substrate with a first thermal conductivity $\lambda_{MP}$, wherein the measurement pixels are sensitive to infrared radiation and each provide a measurement signal for establishing a temperature measurement value $T_{MP}$ which is dependent on an intensity of the incident infrared radiation, with a plurality of reference pixels, which are each connected to the detector array substrate with a second thermal conductivity $\lambda_{BP}$ and which each provide a measurement signal for establishing a temperature measurement value $T_{BP}$, wherein the reference pixels are realized as blind pixels that are substantially insensitive to infrared radiation, wherein the second thermal conductivity $\lambda_{BP}$ is greater than the first thermal conductivity $\lambda_{MP}$.

Further, an evaluation apparatus of the infrared measurement system is configured to carry out the method according to the invention for contactlessly establishing a temperature of a surface, in particular for contactlessly establishing a temperature distribution on a surface. Underlying the method there is an infrared measurement system, in particular a handheld thermal imaging camera, for contactlessly establishing a temperature distribution on a surface, as described below.

The infrared measurement system, in particular the handheld thermal imaging camera, configured to detect, in particular in contactless fashion, thermal radiation emitted from a measurement region on the surface. The infrared measurement system is provided to output an information item relating to a temperature of the surface. Advantageously, this information item can be realized as one or more temperature specifications or as a temperature distribution, particularly advantageously as a thermal image that is composed of a multiplicity of temperature specifications established in a spatially resolved fashion.

The "measurement region" is understood to mean a geometric, delimited region which comprises a number of particles or regions of the object, the thermal radiation of which departs from the object in the direction of the infrared measurement system and is at least partly captured by the latter. Depending on the material of the object, in particular depending on the transparency of the object to infrared radiation, the infrared measurement system may capture particles or regions which are at various distances within the object. In particular, in addition to a solid, an "object" can also be understood to mean a fluid, in particular a liquid and a gas, whose temperature can be measured in analogous fashion. In order to simplify the following description, "measurement region" denotes, in particular, the region on an object surface that substantially emerges from the intersection between a measurement volume—the volume from which the apparatus according to the invention captures thermal radiation—and the surface of the object to be examined. Depending on the material properties of the object, this measurement region may, however, also comprise thermal radiation from deeper layers within in the object.

The infrared measurement system, in particular the handheld thermal imaging camera, comprises at least one infrared detector array and an evaluation apparatus. Further, in one embodiment of the infrared measurement system, the infrared measurement system may comprise an optical unit, in particular an imaging optical unit. An optical unit is provided to project thermal radiation emitted from the measurement region in the infrared spectrum, preferably in the mid-wavelength infrared spectrum in the wavelength range between 3 μm and 50 μm, onto a surface of the infrared detector array of the infrared measurement system that, from the view of the object, is arranged downstream of the optical unit. In one embodiment of the infrared measurement system, the optical unit also can be provided to project an image of the measurement region onto a surface of the infrared detector array, preferably to focus an image of the measurement region onto a surface of the infrared detector array. To this end, an optical unit can comprise optical components that steer, guide, focus and/or otherwise influence the spatial propagation of thermal radiation, for example lenses, mirrors or the like. Further, an optical unit can be provided in one embodiment for changeably setting a size of the measurement region situated on the surface using the optical unit, in particular to continuously set this in "zoomable" fashion.

Below, "provided" should be specifically understood to mean "programmed", "designed", "configured" and/or "equipped". An object being "provided" for a specific function should be understood to mean, in particular, that the object satisfies and/or carries out this specific function in at least one application and/or operating state or that said object is designed to satisfy this function.

The infrared detector array serves to capture infrared radiation, in particular thermal radiation, emitted by the measurement region and guided onto the surface of the infrared detector array (nota bene: in this document, the terms "infrared radiation" and "thermal radiation" are used synonymously). The infrared detector array has at least one detector array substrate and a plurality of measurement pixels and a plurality of reference pixels. In one embodiment of the infrared measurement system, the infrared detector array is realized as a silicon sensor chip, for example, which has silicon as a detector array substrate.

The measurement pixels are each arranged on a surface of the detector array substrate facing the object to be examined. The measurement pixels are sensitive to infrared radiation incident from the measurement region, wherein each measurement pixel represents a radiation sensitive element, in particular an infrared-light-sensitive element. Examples of infrared-light-sensitive elements are, inter alia, photodiodes, bolometers, pyroelectric sensors, p-n diodes, PIN diodes, avalanche photodiodes (APD), (modulated) COD chips and CMOS pixels; however, this may also be understood to mean other infrared-light-sensitive elements that appear expedient to a person skilled in the art, for example based on silicon sensors, indium gallium arsenide sensors, lead sulfide sensors, indium antimony sensors, cadmium mercury telluride sensors, gallium arsenide quantum well sensors, cadmium mercury telluride sensors or the like. In one embodiment of the infrared measurement system, the measurement pixels are realized as p-n diodes or so-called thermal diodes. The measurement pixels are provided to capture radiation from the infrared range, in particular the mid-wavelength infrared range in the wavelength range between 3 μm and 50 μm, and convert said radiation into a measurement signal, in particular an electrical measurement signal.

Each measurement pixel is connected to the detector array substrate with a first thermal conductivity $\lambda_{MP}$. "Connected with a thermal conductivity $\lambda$" should be understood to mean that a respective pixel (the general expression "pixel" denotes both measurement pixels and reference pixels below) has a capability for dissipating heat, introduced by means of infrared radiation, to the detector array substrate on account of the connection of said pixel to the detector array substrate, i.e. on account of the mechanical connection of said pixel to the detector array substrate. Here, a heat flux flowing from the respective pixel to the detector array substrate is proportional to the thermal conductivity $\lambda$ of its connection according to $P=\lambda \cdot \Delta T$. Here, the following applies to the thermal conductivity:

$$\lambda=\lambda_{spec.} \cdot A/L \qquad (1)$$

where A is a cross-sectional area through which the heat flux flows and L is the length of the connection to the detector array substrate, $\Delta T$ is the temperature difference that drops over the connection and $\lambda_{spec.}$ is the specific, i.e., material-intrinsic, thermal conductivity of the material of the connection.

Aa a consequence of the irradiation by infrared radiation $P_{MP}$, a respective measurement pixel heats by $\Delta T_{MP}$, wherein, in one embodiment of the infrared measurement system, there is a change in the voltage of the measurement pixel in relation to a current $I_{MP}$ flowing through the measurement pixel on account of the heating. Consequently, there is a change in the voltage drop across the measurement pixel. In this way, a measurement signal that correlates with the radiated-in heat output of the infrared radiation $P_{MP}$ on the measurement pixel can be provided by capturing the measurement pixel voltage $U_{MP}$ and/or the measurement pixel current $I_{MP}$. Consequently, the measurement pixels each provide a measurement signal depending on an intensity of the incident infrared radiation for establishing a temperature measurement value $T_{MP}$, which likewise depends on the intensity of the incident infrared radiation. The first thermal conductivity $\lambda_{MP}$, with which the measurement pixels are connected to the detector array substrate, is advantageously chosen in one embodiment of the infrared measurement system in such a way that the measurement pixels have a high sensitivity for radiated-in infrared radiation.

The measurement signals of each measurement pixel can be provided as, for example, a voltage or an electric current from the measurement pixels. In particular, reference is made to the fact that the respective measurement signals of each measurement pixel are provided, or can be provided, independently of one another. For the purposes of establishing a temperature measurement value $T_{MP}$, each measurement signal provided by a measurement pixel can, or will be, transmitted to the evaluation apparatus of the infrared measurement system, by means of which said measurement signal can be evaluated individually and/or in combination with other measurement signals from other measurement pixels. Consequently, a plurality of temperature measurement values $T_{MP}$ can be established using a plurality of measurement pixels (any plurality of measurement pixels) of the infrared detector array. In particular, an image information item for a thermal image can be established in this way from infrared radiation respectively emitted by the object to be examined in a solid angle of the measurement region.

According to the invention, the infrared detector array has a multiplicity of reference pixels in addition to the measurement pixels, said reference pixels providing respective measurement signals in the form of a voltage $U_{BP}$ or of an electric current $I_{BP}$, in particular independently of one another. Here, preferably, the functionality of the reference pixels is based on the same functional relationships as in the measurement pixels; i.e., the reference pixels are likewise realized as infrared-light-sensitive elements such as, for example, photodiodes, bolometers, pyroelectric sensors, p-n diodes, PIN diodes, avalanche photodiodes (APD), (modulate) CCD chips and CMOS pixels, or the like. Particularly preferably, the reference pixels, in principle, consist of the same infrared-light-sensitive elements as the measurement pixels, wherein, however, the reference pixels are realized as blind pixels that are insensitive to infrared radiation incident from the measurement region (note: the terms "reference pixel" and "blind pixel" should be considered to be synonymous in this document and are used synonymously).

To this end, each reference pixel is connected to the detector array substrate with a second thermal conductivity $\lambda_{BP}$, the second thermal conductivity $\lambda_{BP}$ of the reference pixels being greater than the first thermal conductivity $\lambda_{MP}$ of the measurement pixels. Here, a heat flux flowing from the respective reference pixel to the detector array substrate is greater than a heat flux flowing from a measurement pixel to the detector array substrate. Here, as a consequence of the irradiation by infrared radiation, a reference pixel heats by $\Delta T_{BP}$, which is less than $\Delta T_{MP}$ of the measurement pixels—provided the reference pixels, on account of their arrangement on the detector array, are even struck by radiated-in infrared radiation. Consequently, the measurement signal provided by the reference pixels also reflects a lower temperature increase by the reference pixels.

In an embodiment of the infrared measurement system, the second thermal conductivity $\lambda_{BP}$, with which the reference pixels are connected to the detector array substrate, is advantageously chosen in such a way that the reference pixels have negligible sensitivity to infrared radiation radiated thereon. In particular, "negligible sensitivity" or "substantially insensitive" should be understood to mean that the sensitivity of the reference pixels is significantly lower than the sensitivity of the measurement pixels, in particular by a factor of 10, preferably by a factor of 100, particularly preferably by a factor of 1000 or more. In particular, this can be achieved if the incident infrared radiation is output so quickly to the detector array substrate via the connection that there is no significant, heating of the reference pixels. Within this meaning, the reference pixels each provide a measurement signal, which is independent of an intensity of the incident infrared radiation, for the purposes of establishing a temperature measurement value $T_{BP}$, which is likewise independent of the intensity of the incident infrared radiation.

By capturing the measurement pixel voltage $U_{BP}$ and/or the measurement pixel current $I_{BP}$, it is thus possible to establish a measurement signal that correlates at least to a lesser extent, preferably virtually not at all, with the radiated-in thermal output of the infrared radiation. For the purposes of establishing a temperature measurement value $T_{BP}$, each measurement signal provided by a reference pixel is transmitted to the evaluation apparatus of the infrared measurement system, by means of which it is, or can be, evaluated individually and/or in combination with other measurement signals from other reference pixels—in a manner analogous to the measurement signals of the measurement pixels. Consequently, a plurality of temperature measurement values $T_{BP}$ can be established using at least a plurality of reference pixels of the infrared detector array.

As a result of the different thermal connections of the measurement pixels and of the reference pixels to the detector array substrate, a substantial difference arises in respect of the detection capability of measurement pixels and reference pixels—despite preferably identical physical operating principles or functional principles of the measurement pixels and of the reference pixels. While the measurement pixels are sensitive to received infrared radiation on account of the comparatively poor thermal conductivity $\lambda_{MP}$ of their connection to the detector array substrate, the reference pixels are insensitive to received infrared radiation on account of the comparatively good thermal conductivity $\lambda_{BP}$ of their connection to the detector array substrate. Advantageously, the reference pixels are in thermal equilibrium with the components of the infrared measurement system, in particular with the detector array substrate, and optionally with further components of the infrared measurement system, such as elements of the optical unit or of the housing, for example, on account of their comparatively good thermal connection $\lambda_{BP}$.

In one embodiment of the infrared measurement system according to the invention, the first thermal conductivity $\lambda_{MP}$ is less than the second thermal conductivity $\lambda_{BP}$ by a factor of 10, preferably by a factor of 100, particularly preferably by a factor of 1000 or more. An advantageous, significant difference in respect of the detection capability of measurement pixels and reference pixels can be achieved in the case of a factor of 1000, in particular.

In one embodiment of the infrared measurement system according to the invention, the first thermal conductivity $\lambda_{MP}$ is realized by a first effective cross-sectional area $A_{MP}$ and a first effective length $L_{MP}$ of first connection elements, by way of which the measurement pixels are connected to the detector array substrate, and the second thermal conductivity $\lambda_{BP}$ is realized by a second effective cross-sectional area $A_{BP}$ and a second effective length $L_{BP}$ of second connection elements, by way of which the reference pixels are connected to the detector array substrate, wherein the first effective cross-sectional area $A_{MP}$ of the first connection elements differs from the second effective cross-sectional area of the second connection elements $A_{BP}$ and/or wherein the first effective length $L_{MP}$ of the first connection elements differs from the second effective length $L_{BP}$ of the second connection elements such that $A_{MP}/L_{MP} \neq A_{BP}/L_{BP}$.

A respective "effective cross-sectional area A" is defined as the sum of the cross-sectional areas of the individual connection elements, by means of which a respective pixel is connected to the detector array substrate. The "effective length" corresponds to the mean length of the individual connection elements, by means of which a respective pixel is connected to the detector array substrate.

In particular, the thermal conductivity of the connection of reference pixels and measurement pixels can be influenced, and set during manufacturing, by way of the length L and/or the cross-sectional area A of the connection elements according to the proportionality $\lambda \sim A/L$. Here, the ratio of cross-sectional area A to length L defines the thermal conductivity of the connection of measurement pixels and reference pixels to the detector array substrate by way of the geometric design of the connection elements.

In one embodiment of the infrared measurement system according to the invention, the second effective cross-sectional area $A_{BP}$ of the second connecting elements is realized as a multiple of the first effective cross-sectional area $A_{MP}$ of the first connecting elements, in particular it is twice the latter, preferably five times the latter, particularly preferably ten times the latter or more, and/or the first effective length $L_{MP}$ of the first connection elements is realized as a multiple of the second effective length $L_{BP}$ of the second connection elements, in particular it is twice the latter, preferably five times the latter, particularly preferably ten times the latter or more.

In one embodiment of the infrared measurement system according to the invention, the first thermal conductivity $\lambda MP$ is realized by first connection elements of at least 100 μm length and the second thermal conductivity $\lambda_{BP}$ is realized by second connection elements of at most 10 μm length.

In an exemplary embodiment of the infrared measurement system, the first thermal conductivity $\lambda MP$ can be realized by two first connection elements of at least 100 μm length and the second thermal conductivity $\lambda_{BP}$ can be realized by twenty second connection elements of at most 10 μm length.

In one embodiment of the infrared measurement system according to the invention, the measurement pixels and the reference pixels are realized as p-n diodes (thermal diodes).

In this way, an infrared detector array can be advantageously realized as a semiconductor sensor using semiconductor technology. Further, using p-n diodes advantageously renders it possible to capture small changes in the temperature to be measured or in the infrared radiation and/or to eliminate disturbance signals that are caused by the measurement electronics of the semiconductor sensor. By way of example, such disturbance signals can be a temperature drift caused by a changing temperature of the measurement electronics during operation. To this end, at least one second reference pixel may be furthermore present, in particular present on the detector array substrate, in addition to the measurement pixels and the reference pixels in one embodiment of the infrared measurement system. This at least one second reference pixel is connected to the detector array substrate with a third thermal conductivity $\lambda_{RP}$, wherein the third thermal conductivity $\lambda_{RP}$ substantially corresponds to the second thermal conductivity $\lambda_{BP}$ of the reference pixels (blind pixels). Thus, the measurement signals of the measurement pixels and/or the reference pixels can be captured as difference measurement signals in relation to a reference signal provided by the at least one second reference pixel, for example as a voltage difference between each measurement pixel and the at least one second reference pixel and/or as a voltage difference between each reference pixel and the at least one second reference pixel. In this way, it is possible to capture temperature changes, in particular changes in the intensity of the incident infrared radiation, which lead to small differences or changes in the measurement signals (for example, in the mV range), in an advantageously accurate and highly resolved manner by means of a difference amplifier. In particular, provision can be made in such an embodiment for the measurement pixels and/or the reference pixels to be able to be connected to the difference amplifier (for example using a multiplexer) independently of one another, in particular in selective fashion.

Each of the plurality of measurement pixels and each of the plurality of reference pixels is signal-connectable to the evaluation apparatus of the infrared measurement system, either directly or indirectly via further interposed components. In particular, an indirect signal-connection of the pixels to the evaluation apparatus also can be realized by way of switching elements, e.g., multiplexers or other selection circuits, which are designed to selectively transmit detection signals of a plurality of pixels. What this can achieve, in particular, is that detection signals of individual pixels or a group of pixels can be transmitted to the evaluation apparatus independently of the detection signals of other pixels and can be evaluated by said evaluation apparatus.

The evaluation apparatus for receiving and evaluating measurement signals of the infrared detector array should be understood to mean an apparatus comprising at least one information input for receiving measurement signals, an information processing unit for processing, in particular evaluating, the received measurement signals, and an information output for transmitting the processed and/or evaluated measurement signals, in particular, temperature measurement values $T_{MP}$ and $T_{BP}$. Advantageously, the evaluation apparatus has components which comprise at least one processor, a memory and an operating program with evaluation and calculation routines. In particular, the electronic components of the evaluation apparatus can be arranged on a circuit board (printed circuit board), preferably on a common circuit board with a control apparatus of the infrared measurement system for controlling the infrared measurement system and, particularly preferably, in the form of a microcontroller. Moreover, the control apparatus and the evaluation apparatus can also be embodied as a single component. The evaluation apparatus is provided to receive and evaluate measurement signals provided by the infrared detector array, in particular measurement signals provided by the measurement and reference pixels of the infrared detector array, which pixels are signal-connectable to the evaluation apparatus, and to carry out an evaluation of the temperature of the measurement region on the basis of measurement signals from at least a plurality of measurement and reference pixels of the infrared detector array. In particular, the evaluation apparatus is provided to carry out an evaluation of one or more temperature measurement values $T_{MP}$ and $T_{BP}$ on the basis of measurement signals of at least a plurality (any plurality) of measurement and reference pixels of the infrared detector array. The evaluated temperature measurement values $T_{MP}$ and $T_{BP}$ can be provided by the evaluation apparatus for further processing and/or for output purposes, in particular for output to a user of the infrared measurement system by means of an output apparatus and/or for output to an external appliance by means of a data communications interface.

In one embodiment, the plurality of measurement pixels are arranged in matrix-like fashion on the surface of the detector array substrate. By way of example, the measurement pixels number 80×80 pixels, preferably 360×240 pixels, particularly preferably 640×480 pixels. Any other values are conceivable. The number of measurement pixels defines the resolution of the infrared measurement system, i.e., in particular, the resolution of a thermal image, measured by means of the infrared measurement system, of an object to be examined.

In principle, the arrangement of the reference pixels on the detector array substrate is as desired. An arrangement on the side of the detector array substrate facing the object to be examined is not mandatory, but advantageous in view of economical manufacturing.

In one embodiment of the infrared measurement system according to the invention, an arrangement of reference pixels surrounds an array of measurement pixels arranged on the infrared detector array; in particular, the arrangement of reference pixels frames the array of measurement pixels arranged on the infrared detector array.

In this way, there can be a particularly homogeneous and, in particular, gap-free capture of infrared radiation from the solid angle range since the infrared detector array is provided with measurement pixels in homogeneous and, in particular, gap-free fashion. By virtue of the reference pixels being arranged around the array of measurement pixels, the array of measurement pixels can be positioned centrally, i.e., in the focus of the incident infrared radiation.

In one embodiment of the infrared measurement system according to the invention, the reference pixels are arranged in an array of measurement pixels arranged on the infrared detector array, in particular arranged in regular fashion, preferably arranged in symmetric fashion, particularly preferably arranged in symmetric fashion in relation to at least one main axis of symmetry of the infrared detector array.

A "symmetric arrangement" should be understood to mean, in particular, that the reference pixels are arranged in symmetric fashion, in particular in point and/or mirror symmetric fashion, in the array of measurement pixels. In particular, provision can be made for reference pixels, which each have an identical distance from the geometric center of the infrared detector array, to be arranged in substantially ring-shaped structures. Advantageously, reference pixels can also be arranged in point symmetric fashion in each case in relation to the geometric center of the infrared detector array such that, for example, an arrangement of two first reference pixels is implemented in point symmetric fashion with respect to two further reference pixels in relation to the geometric center of the infrared detector array. In this way, the symmetric arrangement, facilitates a particularly simple, structured arrangement of the reference pixels which allows a particularly accurate establishment, advantageously with local spatial resolution, of temperature measurement values $T_{BP}$.

The described infrared measurement system serves as a basis for the method, described below, for contactlessly establishing a temperature of a surface, in particular for contactlessly establishing a temperature distribution on a surface.

The method serves primarily for correcting a pixel-associated temperature drift component $T_{drift}$, by means of which the temperature measurement values $T_{MP}$ established from the measurement signals of the respective measurement pixels and/or the temperature measurement values $T_{BP}$ established from the measurement signals of the respective reference pixels are displaced. ("drift") in time-dependent fashion.

The aging of the infrared detector array as a result of detector-array-intrinsic effects such as, in particular, charge shifts in the individual measurement or reference pixels is a substantial influencing variable on this displacement, or else "temperature drift". The temperature drift of the individual pixels is expressed, in particular, by time-varying deviations ("offsets") of the measurement signals output by the respective pixels and consequently also by temporal deviations of the temperature measurement values ($T_{MP}$, $T_{BP}$) determined from the measurement signals of the respective pixels. Expressed vividly, different temperature measurement values $T_{MP}$ and $T_{BP}$ are established in time-dependent fashion in the case of an unchanged temperature of the infrared detector array and in the case of an unchanged incidence of infrared radiation. This time-dependent displacement of the temperature measurement values leads to the output of a continuously falsifying examination result of the temperature to be established on the surface.

Currently, such unwanted effects are corrected by the use of closure elements such as, e.g., a "shutter", such that the infrared detector array examines an area of known temperature that is as homogeneous as possible in the case of the calibration with a closed closure element. Here, the temperature of the shutter must be known. The temperature drift can be subsequently corrected once this temperature is known.

Here, the method according to the invention for contactlessly establishing a temperature of a surface, in particular for contactlessly establishing a temperature distribution on a surface, proceeds from the infrared measurement system, already presented above, which at least comprises: an infrared detector array with a detector array substrate and with a plurality of measurement pixels, which are each connected to the detector array substrate with a first thermal conductivity $\lambda_{MP}$, wherein the measurement pixels are sensitive to infrared radiation and each provide a measurement signal for establishing a temperature measurement value $T_{MP}$ which is dependent on an intensity of the incident infrared radiation, with a plurality of reference pixels, which are each connected to the detector array substrate with a second thermal conductivity $\lambda_{BP}$ and which each provide a measurement signal for establishing a temperature measurement value $T_{BP}$, and wherein the method comprises at least the following steps:

determining the temperature measurement values $T_{BP}$ of a plurality of reference pixels;

determining the temperature measurement values $T_{MP}$ of a plurality of measurement pixels;

correcting temperature measurement values $T_{MP}$ by in each case a pixel-associated temperature drift component $T_{drift}$.

According to the invention, the reference pixels are realized as blind pixels that are substantially insensitive to infrared radiation, wherein the second thermal conductivity $\lambda_{BP}$ is greater than the first thermal conductivity $\lambda_{MP}$, and the temperature drift components $T_{drift}$ are determined using temperature measurement values $T_{BP}$.

In particular, the evaluation apparatus is provided to carry out the method according to the invention for contactlessly establishing a temperature of a surface, in particular for contactlessly establishing a temperature distribution on a surface.

"Determining the temperature measurement values $T_{BP}$ of a plurality of reference pixels" and "determining the temperature measurement values $T_{MP}$ of a plurality of measurement pixels" should be understood to mean, in particular, that measurement signals are initially provided from any plurality of reference pixels or any plurality of measurement pixels and said measurement signals are transmitted to the evaluation apparatus.

From the measurement signals provided by the reference pixels, the evaluation apparatus in each case evaluates a temperature measurement value $T_{BP}$ for the corresponding reference pixels. Accordingly, the evaluation apparatus in each case evaluates a temperature measurement value $T_{MP}$ from the measurement signals provided by the measurement pixels. Examined more closely, the evaluation apparatus naturally evaluates a pixel-dependent temperature measurement value $T_{BP}^{i}$ ($T_{MP}^{i}$) for corresponding reference pixels (measurement pixels) i. Here, "pixel-dependent" means, in particular, that the respective temperature measurement value (index "i") is uniquely assigned to a certain pixel (i) Thus, below, both the individual temperature measurement values—i.e., $T_{BP}^i$, $T_{MP}^i$—and, analogous thereto, also the temperature drift components $T_{drift}^k$ established for a certain measurement pixel k are combined as respective sets $T_{BP}$, $T_{MP}$ and $T_{drift}$ in order to avoid confusion as a result of indices.

Reference is made to the fact that the plurality of measurement pixels or reference pixels can correspond to any plurality, which need not necessarily correspond to the totality of the available measurement pixels or reference pixels. Therefore, the set of evaluated pixels can be smaller than the set of pixels available overall on the infrared detector array.

In one embodiment of the method, the individual temperature measurement values can be realized as values characterizing the temperature of the surface to be examined, for example in degrees Celsius (° C.) or Kelvin (K) or the like.

"Determining the temperature drift components $T_{drift}$ using temperature measurement values $T_{BP}$" should be understood to mean that the temperature measurement values $T_{BP}$, which are established on the basis of the measurement signals provided by the reference pixels, are used to evaluate the respective, pixel-dependent temperature drift components $T_{drift}$ for the measurement pixels. "Correcting temperature measurement values $T_{MP}$ by pixel-associated temperature drift components $T_{drift}$ in each case" denotes a correction which is applied to each measurement pixel of the plurality of measurement pixels, for which temperature measurement values $T_{MP}$ have been determined. In one embodiment of the method, this can be implemented, in particular, by virtue of a temperature measurement value $T_{MP}$ established for a respective measurement pixel having added or subtracted thereto an associated temperature drift component $T_{drift}$ that is established for this measurement pixel, i.e., $T_{MP}^{corr} = T_{MP} + T_{drift}$. Advantageously, this allows a temperature measurement variable (namely $T_{BP}$) that is independent of the incident infrared radiation to be used for correcting the drift temperature.

In particular, this allows a closure mechanism and temperature monitoring of this closure mechanism for the purposes of correcting the temperature drift of the measurement pixels to be dispensed with.

In one embodiment of the method according to the invention, the temperature drift components $T_{drift}$ are determined repeatedly at time intervals, in particular regularly, preferably continuously or virtually continuously.

What can be realized by the repeated determination of the temperature drift components $T_{drift}$ at time intervals is an implementation of a likewise repeated correction in relation to the temperature drift components $T_{drift}$ of the temperature output of the infrared measurement system to a user, in particular a thermal image. Advantageously, the evaluation apparatus is provided to facilitate a regular determination, in particular a continuous or virtually continuous determination, of the temperature drift components $T_{drift}$ and consequently a regular correction, in particular a continuous or virtually continuous correction, of the established temperature, in particular of the thermal image, as a result of the high processing rate of the temperature measurement values. "Virtually continuous" should be understood to mean that, in particular, the repeated correction has an appliance-internal processing time in the evaluation apparatus of less than 10 seconds, preferably of less than 5 seconds, particularly preferably of less than 1 second before the correction of the temperature measurement values $T_{MP}$ is complete. In this way, a user of the infrared measurement system has the impression that the temperature established for the examined surface, in particular the thermal image, is corrected immediately, preferably in real time and continuously.

In one embodiment of the method according to the invention, a temperature drift behavior $m_{BP}$ of the reference pixels is determined from the temperature measurement values $T_{BP}$ of the reference pixels for the purposes of determining the temperature drift components $T_{drift}$.

Advantageously, the temperature drift behavior $m_{BP}$ of the reference pixels represents a suitable measure for the temperature drift of the reference pixels. In particular, the temperature drift behavior $m_{BP}$ can be represented by a mathematical expression such as a function or a constant or the like, for example. Since, in principle, the reference pixels are similar to the measurement pixels in terms of their design—apart from the connection to the detector array substrate—the temperature drift behavior of the measurement pixels and of the reference pixels can be assumed to be comparable. Advantageously, this allows the temperature drift behavior $m_{BP}$ of the reference pixels to be used as a basis for determining the temperature drift components $T_{drift}$, for example by virtue of a quantifiable temperature drift behavior $m_{BP}$ of the reference pixels being converted to a temperature drift behavior of the measurement pixels.

In one embodiment of the method according to the invention, the temperature drift behavior $m_{BP}$ of the reference pixels is determined as a constant of proportionality between initial measurement deviations $T_{BP,offset}$ of the reference pixels and temperature measurement values $T_{BP}$ for the purposes of determining the temperature drift components $T_{drift}$.

The "initial measurement deviation $T_{BP,offset}$ of the reference pixels" should be understood to mean, in particular, the pixel-dependent measurement deviation ("offset") of the reference pixels which are established during a factory calibration of the infrared measurement system. In particular, the evaluation apparatus of the infrared measurement system has the initial measurement deviations $T_{BP,offset}$ available for each reference pixel of the infrared detector array. Advantageously, these may be able to be recalled from a memory of the evaluation apparatus for each reference pixel of the infrared detector array, with a unique assignment of initial measurement deviations $T_{BP,offset}$ to the reference pixels being ensured. In an embodiment of the infrared measurement system, the assignment of the initial measurement deviations $T_{BP,offset}$ to the reference pixels is stored in a table as an "initial offset map".

In the proposed method, the temperature drift behavior $m_{BP}$ of the reference pixels is determined as a constant of proportionality between these initial measurement deviations $T_{BP,offset}$ of the reference pixels and the established temperature measurement values $T_{BP}$. To this end, value pairs ($T_{BP}$, $T_{BP,offset}$) are initially formed for each reference pixel to be evaluated by the assignment of initial measurement deviations $T_{BP,offset}$ to the respective reference pixels. When plotting the established temperature measurement values $T_{BP}$ on the ordinate axis against the initial measurement deviations $T_{BP,offset}$ on the abscissa axis, a data set ("point cloud") emerges, which can preferably be modeled (fitted) by way of a straight line, for example by using a least squares fit or the like. Subsequently, the temperature drift behavior $m_{BP}$ of the blind pixels can be established particularly easily and particularly exactly from the gradient (constant of proportionality) of this straight line. In particular, the following general equation applies to this straight line:

$$T_{BP} = m_{BP} \cdot (T_{BP,offset}^0 - T_{BP,offset}),$$

with an abscissa intercept $T_{BP,offset}^0$. Reference is made to the fact that the image of the determination of the gradient serves illustrative purposes, among other things. In particular, the temperature drift behavior $m_{BP}$ of the reference pixels as a constant of proportionality can also be calculated by means of mathematical methods such as, for example, curve fitting or a linear regression calculation.

The method is based on the discovery that the temperature drift behavior $m_{BP}$ of the reference pixels can be determined particularly advantageously as a measure depending on the initial measurement deviation $T_{BP,offset}$ of the respective reference pixel. This means that those reference pixels which already have a comparatively large initial measurement deviation $T_{BP,offset}$ (offset) at the time of the factory calibration are subject to a stronger temperature drift than reference pixels which, at the time of the factory calibration, only have a small initial measurement deviation $T_{BP,offset}$ (in terms of absolute value).

Advantageously, this can realize a determination of the temperature drift behavior $m_{BP}$ of the reference pixels that can be carried out in a particularly simple and fast manner. Further, requirements on the evaluation apparatus in respect of its computational power can be kept as low as possible using this determination method, and consequently it is possible to save costs.

In one embodiment of the method according to the invention, the temperature drift behavior $m_{BP}$ of the reference pixels is determined as a constant of proportionality between sensitivities of the initial measurement deviations $\partial T_{BP,offset}$ in relation to the influences of aging of the reference pixels and temperature measurement values $T_{BP}$ of the reference pixels for the purposes of determining the temperature drift components $T_{drift}$.

The expression "sensitivities of the initial measurement deviations $\partial T_{BP,offset}$ in relation to the influences of aging of the reference pixels" (shortened below as "sensitivities of the initial measurement deviations $\partial T_{BP,offset}$") is, in particular, a measure for the changeability of the initial measurement deviation $T_{BP,offset}$ (offset values) of the reference pixels on account of an external physical influence which brings about artificially accelerated aging of the reference pixels ("the susceptibility to changes of the offset values under the influence of aging"). Expressed differently, the sensitivities of the initial measurement deviations $\partial T_{BP,offset}$ denotes the susceptibility of a reference pixel to react to an external physical influence with a change in the initial measurement deviation $T_{BP,offset}$. By way of example, such an external physical influence can be exerted by storage at a high temperature, a high current in the infrared detector array or the like.

"Sensitivities of the initial measurement deviations $\partial T_{BP,offset}$ in relation to the influences of aging of the reference pixels" should be understood to mean, in particular, those pixel dependent sensitivities of the initial measurement deviations $\partial T_{BP,offset}$ in relation to the influences of aging of the reference pixels which are established during a factory calibration of the infrared measurement system. In particular, the evaluation apparatus of the infrared measurement system has available the sensitivities of the initial measurement deviations $\partial T_{BP,offset}$ in relation to the influences of aging for each reference pixel of the infrared detector array. Advantageously, these may be able to be recalled from a memory of the evaluation apparatus for each reference pixel of the infrared detector array, with a unique assignment of sensitivities of the initial measurement deviations $\partial T_{BP,offset}$ to the reference pixels being ensured. In an embodiment of the infrared measurement system, the assignment of the sensitivities of the initial measurement deviations $\partial T_{BP,offset}$ to the reference pixels is stored in a table as an "initial drift susceptibility map".

In the proposed method, the temperature drift behavior $m_{BP}$ of the reference pixels is determined as a constant of proportionality between these sensitivities of the initial measurement deviations $\partial T_{BP,offset}$ of the reference pixels and the established temperature measurement values $T_{BP}$ of the reference pixels. To this end, value pairs ($T_{BP}$, $\partial T_{BP,offset}$) are initially formed for each reference pixel to be evaluated by the assignment, of sensitivities of the initial measurement deviations $\partial T_{BP,offset}$ to the respective reference pixels. When plotting the established temperature measurement values $T_{BP}$ on the ordinate axis against the sensitivities of the initial measurement deviations $\partial T_{BP,offset}$ on the abscissa axis, a data set ("point cloud") emerges, which can preferably be modeled (fitted) by way of a straight line, for example by using a least squares fit or the like. Subsequently, the temperature drift behavior $m_{BP}$ of the blind pixels can be established particularly easily and particularly exactly from the gradient (constant of proportionality) of this straight line. In particular, the following general equation applies to this straight line:

$$T_{BP}=m_{BP}\cdot(\partial T_{BP,offset}^0-\partial T_{BP,offset}),$$

with an abscissa intercept $\partial T_{BP,offset}^0$. Reference is made to the fact that the image of the determination of the gradient serves inter alia illustrative purposes. In particular, the temperature drift behavior $m_{BP}$ of the reference pixels as a constant of proportionality can also be calculated by means of mathematical methods such as, for example, curve fitting or a linear regression calculation.

The method is based on the discovery that the temperature drift behavior $m_{BP}$ of the reference pixels can be determined particularly advantageously as a measure depending on the sensitivity of the initial measurement deviation $\partial T_{BP,offset}$ of the respective reference pixel. This means that those reference pixels which already exhibit signs for greater sensitivity of their initial measurement deviation in relation to the influence of aging at the time of the factory calibration are subject to a stronger temperature drift than reference pixels which, at the time of the factory calibration, hardly have indications for such a sensitivity.

Advantageously, this can realize a determination of the temperature drift behavior $m_{BP}$ of the reference pixels that can be carried out in a particularly simple and fast manner. Further, requirements on the evaluation apparatus in respect of its computational power can be kept particularly low using this determination method, and consequently it is possible to save costs.

In one embodiment of the method according to the invention, a mathematical relationship is established between a temperature drift behavior $m_{MP}$ of measurement pixels and a temperature drift behavior $m_{BP}$ of reference pixels for the purposes of determining the temperature drift components $T_{drift}$, and the temperature drift behavior $m_{MP}$ of measurement pixels is determined from the mathematical relationship.

In particular, this allows a temperature drift behavior $m_{MP}$ of the measurement pixels to be established directly from the already determined temperature drift behavior $m_{BP}$ of the reference pixels. Here, a "mathematical relationship" should be understood to mean any functional relationship between the two temperature drift behaviors, for example in the form of a mathematical function, a conversion prescription or the like:

$$m_{MP}:=f(m_{BP}).$$

In one embodiment of the method according to the invention, the temperature drift behavior $m_{MP}$ of the measurement pixels is set equal to the temperature drift behavior $m_{BP}$ of the reference pixels.

Advantageously, the temperature drift behavior $m_{MP}$ of the measurement pixels is mathematically related in a particularly simple manner to the temperature drift behavior $m_{BP}$ of the reference pixels in this way, the following applying to said mathematical relationship:

$$m_{MP} := m_{BP}.$$

Advantageously, this can realize a determination of the temperature drift behavior $m_{MP}$ of the measurement pixels from the temperature drift behavior $m_{MP}$ of the reference pixels that can be carried out in a particularly simple and fast manner. Further, requirements on the evaluation apparatus in respect of its computational power can be kept as low as possible using this determination method, and consequently it is possible to save costs.

In one embodiment of the method according to the invention, the temperature drift components $T_{drift}$ are determined from the temperature drift behavior $m_{MP}$ of measurement pixels.

The temperature drift behavior $m_{MP}$ of the measurement pixels can be advantageously used to determine the temperature drift components $T_{drift}$ of the measurement pixels since it can be considered to be a measure of the temperature drift. It can therefore also be considered to be a measure of the temperature drift of the temperature measurement values $T_{MP}$ of the measurement pixels. In one embodiment of the method, the temperature drift behavior $m_{MP}$ of the measurement pixels can be determined from the temperature drift behavior $m_{MP}$ by way of a mathematical relationship.

In one embodiment of the method according to the invention, the temperature drift components $T_{drift}$ are determined from the temperature drift behavior $m_{MP}$ by virtue of the temperature drift components $T_{drift}$ of the respective measurement pixels being calculated in the form of a function as a product of temperature drift behavior $m_{MP}$ and initial measurement deviations $T_{MP,offset}$ of the respective measurement pixels.

This embodiment of the method emerges analogously to the determination of the temperature drift behavior $m_{BP}$ of the reference pixels as a constant of proportionality between initial measurement deviations $T_{BP,offset}$ of the reference pixels and temperature measurement values $T_{BP}$. As already defined analogously for the reference pixels, the "initial measurement deviation $T_{MP,offset}$ of the measurement pixels" should be understood to mean, in particular, the pixel-dependent measurement deviation of the measurement pixels established during the factory calibration of the infrared measurement system. In particular, the evaluation apparatus of the infrared measurement system has the initial measurement deviations $T_{MP,offset}$ available for each measurement pixel of the infrared detector array, said initial measurement deviations advantageously being able to be called for each measurement pixel from a memory of the evaluation apparatus. Here, there also is a unique assignment of initial measurement deviations $T_{MP,offset}$ to the measurement pixels for the measurement pixels. The respectively associated value of the initial measurement deviation $T_{MP,offset}$ can therefore be determined for the measurement pixels. In one embodiment of the infrared measurement system, the assignment of the initial measurement deviations $T_{MP,offset}$ to the measurement pixels likewise is stored in a table, in particular the so-called "initial offset map".

For the purposes of determining the temperature drift components $T_{drift}$, the associated initial measurement deviations $T_{MP,offset}$ are initially determined for each measurement pixel to be evaluated, i.e. to be corrected with respect to a temperature drift component. Subsequently, a temperature drift component $T_{drift}$ belonging to a measurement pixel can be calculated as a product of the temperature drift behavior $m_{MP}$ and the measurement deviation $T_{MP,offset}$ offset belonging to the corresponding measurement pixel:

$$T_{drift} = m_{MP} \cdot (T_{MP,offset}^0 - T_{MP,offset}).$$

This equation likewise represents a linear equation with the constant parameter $T_{MP,offset}^0$. Here, $T_{MP,offset}^0$ also can be zero, in particular.

Advantageously, this can realize a determination of the temperature drift components $T_{drift}$ of the measurement pixels that can be carried out in a particularly simple and fast manner. Further, requirements on the evaluation apparatus in respect of its computational power can be kept as low as possible using this determination method, and consequently it is possible to save costs.

In one embodiment of the method according to the invention, the temperature drift components $T_{drift}$ are determined from the temperature drift behavior $m_{MP}$ by virtue of the temperature drift components $T_{drift}$ of the respective measurement pixels being calculated in the form of a function as a product of the temperature drift behavior $m_{MP}$ and the sensitivities of the initial measurement deviations $\partial T_{BP,offset}$ in relation to the influences of aging of the respective reference pixels.

This embodiment of the method emerges analogously to the determination of the temperature drift behavior $m_{BP}$ of the reference pixels as a constant of proportionality between sensitivities of the initial measurement, deviations $\partial T_{BP,offset}$ offset of the reference pixels and temperature measurement values $T_{BP}$. As already defined analogously for the reference pixels, the "sensitivities of the initial measurement deviations $\partial T_{MP,offset}$ of the measurement pixels" should be understood to mean, in particular, the pixel-dependent sensitivities of the initial measurement deviations $\partial T_{MP,offset}$ of the measurement pixels established during a factory calibration of the infrared measurement system. In particular, the evaluation apparatus of the infrared measurement system has the sensitivities of the initial measurement deviations $\partial T_{MP,offset}$ available for each measurement pixel of the infrared detector array, said sensitivities of the initial measurement deviations advantageously being able to be called for each measurement pixel from a memory of the evaluation apparatus. Here, there also is a unique assignment of sensitivities of the initial measurement deviations $\partial T_{MP,offset}$ to the measurement pixels for the measurement pixels. The respectively associated value of the sensitivities of the initial measurement deviations $\partial T_{MP,offset}$ can therefore be determined for the measurement pixels. In one embodiment of the infrared measurement system, the assignment of the sensitivities of the initial measurement deviations $\partial T_{MP,offset}$ to the measurement pixels likewise is stored in a table, in particular the same table ("initial drift susceptibility map").

For the purposes of determining the temperature drift components $T_{drift}$, the associated sensitivities of the initial measurement deviations $\partial T_{MP,offset}$ are initially determined for each measurement pixel to be evaluated. Subsequently, a temperature drift component $T_{drift}$ belonging to a measurement pixel can be calculated as a product of the temperature drift behavior $m_{MP}$ and the sensitivities of the initial measurement deviations $\partial T_{MP,offset}$ belonging to the corresponding measurement pixel:

$$T_{drift}=m_{MP}\cdot(\partial T_{MP,offset}^{0}-\partial T_{MP,offset}).$$

This equation likewise represents a linear equation with the constant parameter $\partial T_{MP,offset}^{0}$. Here, $\partial T_{MP,offset}^{0}$ also can be zero, in particular.

Advantageously, this can realize a determination of the temperature drift components $T_{drift}$ of the measurement pixels that can be carried out, in a particularly simple and fast manner. Further, requirements on the evaluation apparatus in respect of its computational power can be kept particularly low using this determination method, and consequently it is possible to save costs.

In a further method step in one embodiment of the method according to the invention, an incidence of infrared radiation onto the infrared detector array is suppressed by means of a closure mechanism of the infrared measurement system and the temperature measurement values $T_{MP}$ are each corrected by a pixel-dependent deviation $\Delta T_{MP}^{blind}$ from a mean value $<T_{MP}^{blind}>$ of all temperature measurement values $T_{MP}^{blind}$ measured in the case of a suppressed incidence of infrared radiation.

Since the temperature drift in the non-ideal application can be slightly different on an individual basis for each pixel—measurement pixel and reference pixel—this can advantageously implement a further correction, in particular a homogenization or a reduction of the variance, which is implemented for the temperature measurement values $T_{MP}$ that have already been corrected in terms of the temperature drift component $T_{drift}$ according to the method according to the invention. To this end, in a further method step, an incidence of infrared radiation on the infrared detector array is suppressed, at least intermittently, by means of a closure mechanism of the infrared measurement system, in particular by means of a shutter. The temperature measurement values $T_{MP}^{blind}$ of the measurement pixels established thereupon (and optionally already corrected) will vary about a temperature value that corresponds to the temperature of the closure mechanism. A mean value $<T_{MP}^{blind}>$ formed from all temperature measurement values that were measured when the incidence of infrared radiation was suppressed will come very close to this temperature of the closure mechanism. Therefore, calculating a pixel-dependent deviation $\Delta T_{MP}^{blind}$ from the mean value $<T_{MP}^{blind}>$ for all measurement pixels allows each measurement pixel to be corrected by precisely this deviation and consequently allows homogenization of the temperature measurement values $T_{MP}$ output by the totality of all measurement pixels and adjustment thereof to the mean value.

This further method step of homogenization can be implemented following the correction of the temperature measurement values $T_{MP}$ of the measurement pixels by the temperature drift component $T_{drift}$. As an alternative or in addition thereto, the homogenization can also take place at any other time, for example before the temperature drift component $T_{drift}$ is calculated.

BRIEF DESCRIPTION OF THE DRAWINGS

The invention is explained in more detail in the subsequent description on the basis of exemplary embodiments that are illustrated in the drawings. The drawing, the description and the claims contain numerous features in combination. Expediently, a person skilled in the art will also consider the features individually and combine, these to form meaningful further combinations. The same reference signs in the figures denote the same elements.

In the drawing.

DETAILED DESCRIPTION

Figure 1:
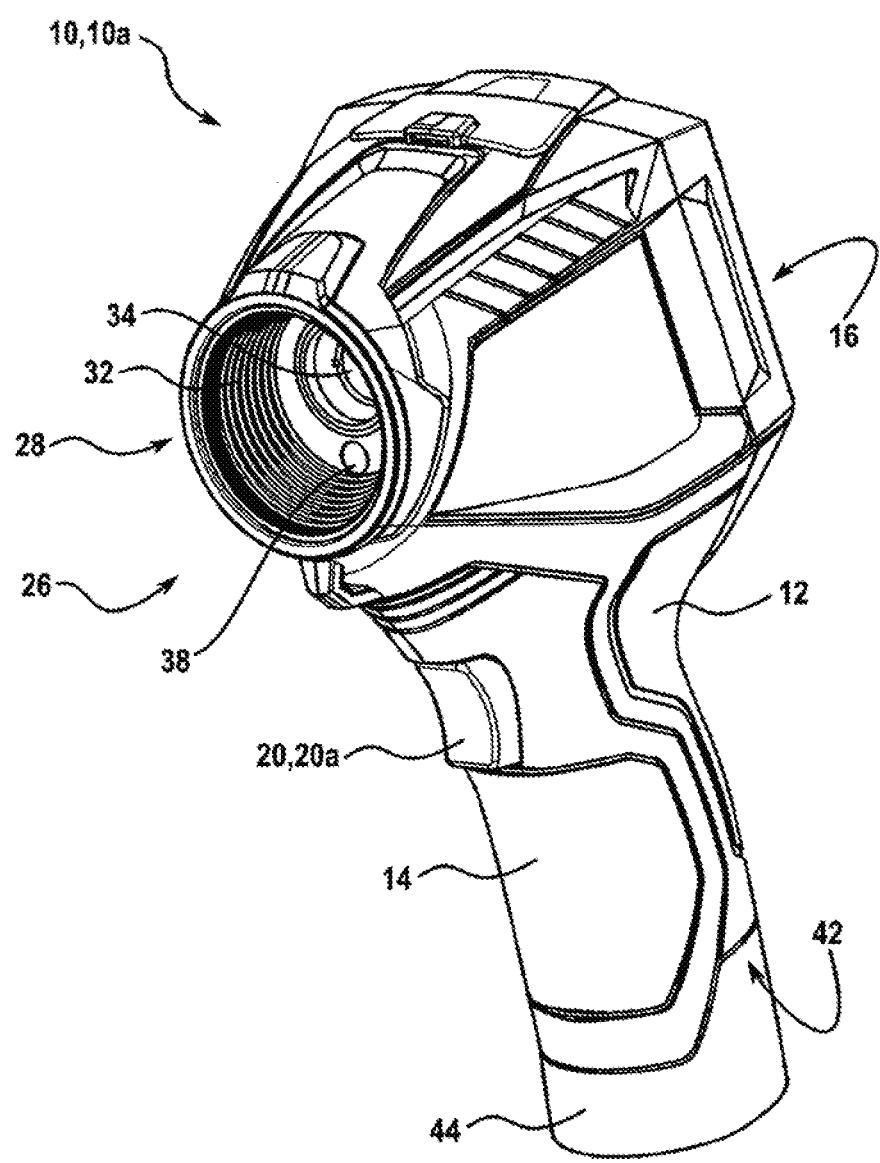
FIG. 1 shows an embodiment of an infrared measurement system according to the invention in a perspective front view.
Figure 2:
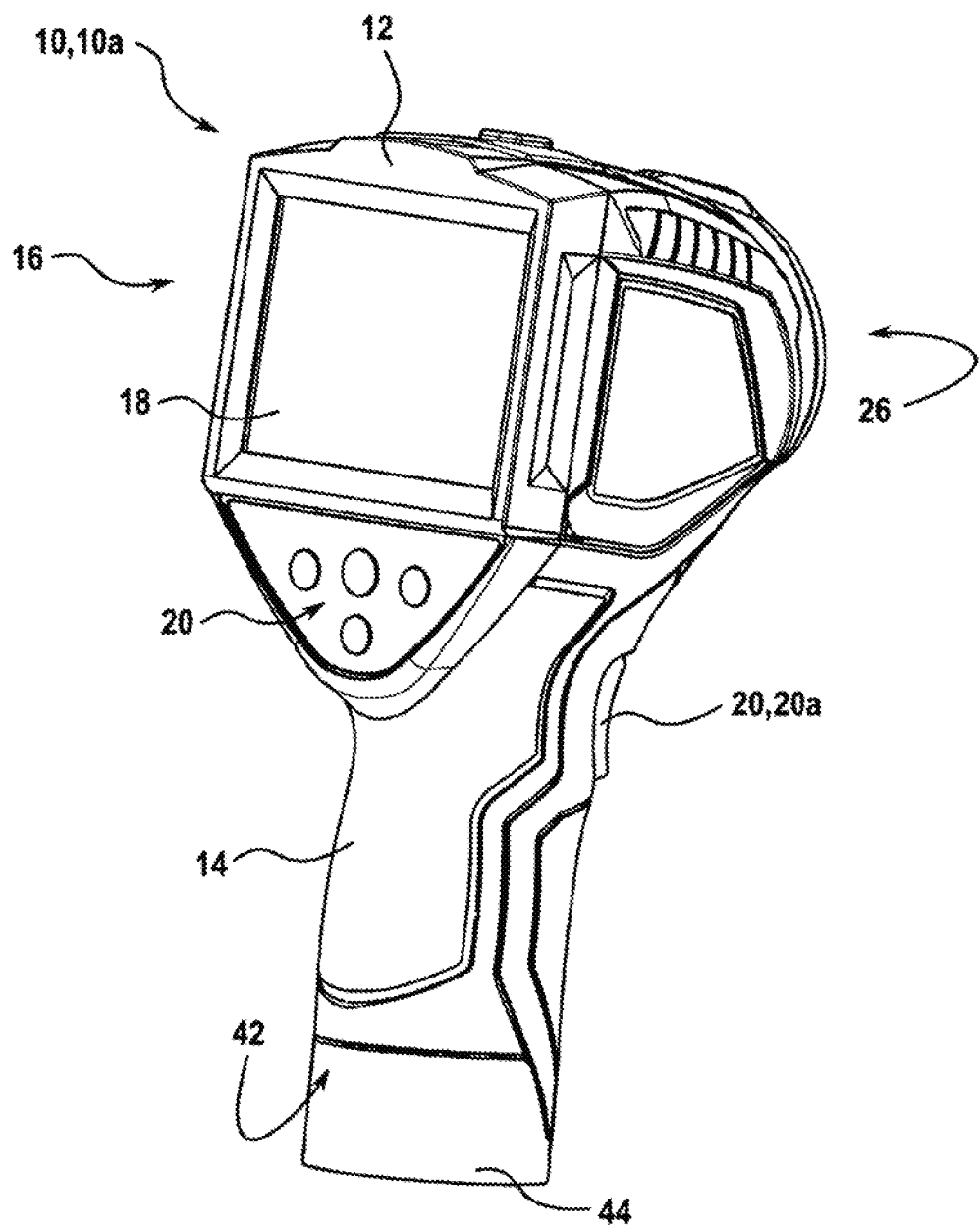
FIG. 2 shows an embodiment of an infrared measurement system according to the invention in a perspective rear view.

An infrared measurement system 10 according to the invention in the form of a handheld thermal imaging camera 10a is presented below. FIG. 1 and FIG. 2 show an exemplary embodiment of this thermal imaging camera 10a in a perspective front view and in a perspective rear view, respectively. The thermal imaging camera 10a comprises a housing 12 with a handle 14. The handle 14 allows the thermal imaging camera 10a to be held comfortably in one hand during its use. Furthermore, the housing 12 of the thermal imaging camera 10a has an output device in the form of a touch-sensitive display 18 and operating elements 20 for user input and control of the thermal imaging camera 10a on a side 16 facing a user during the use of the thermal imaging camera 10a. In particular, the thermal imaging camera 10a has a trigger 20a, by means of which a user can trigger a contactless establishment of a temperature of a surface 22 of an object 24 to be examined, in particular a temperature distribution on a surface 22 of an object 24.

Figure 5:
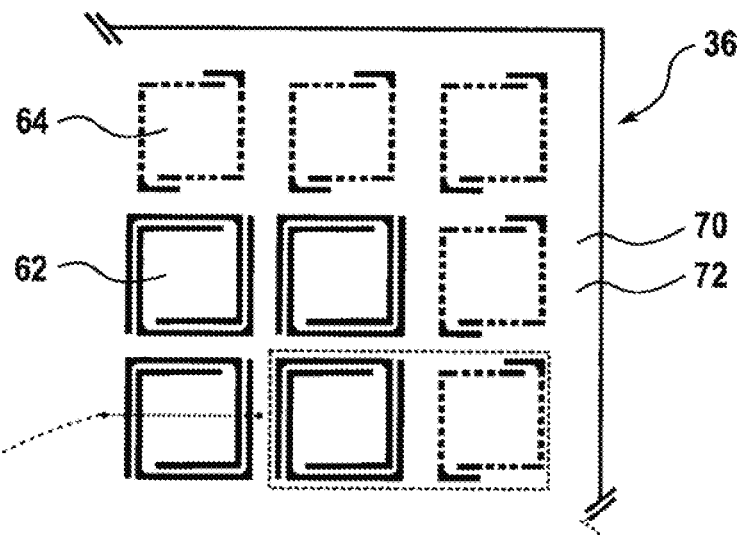
FIG. 5a shows a greatly magnified, schematic top view of measurement pixels and reference pixels of a part of an infrared detector array according to the invention.
FIG. 5b shows a schematic illustration of a section through a measurement pixel.
FIG. 5c shows a magnified section of FIG. 5a, FIG. 5d shows an electrical equivalent circuit diagram of the infrared detector array corresponding to the plan view illustrated in FIG. 5a, FIG. 6a shows a schematic plan view of an embodiment of the infrared detector array according to the invention.
Figure 5:
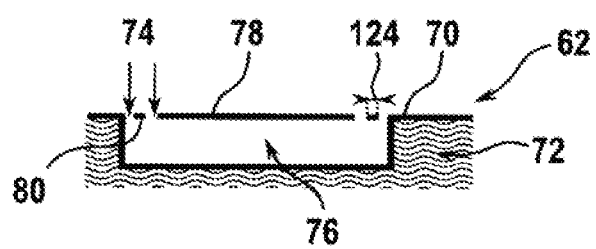
Figure 5:
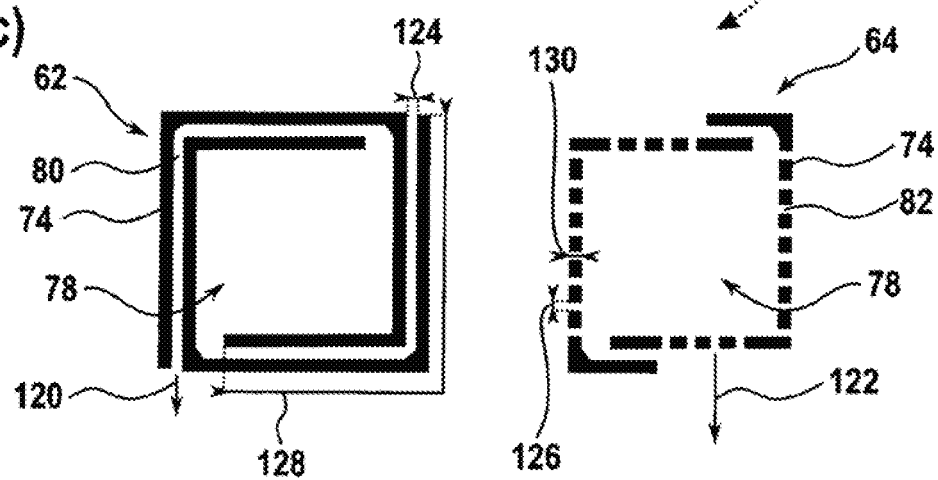
Figure 5:
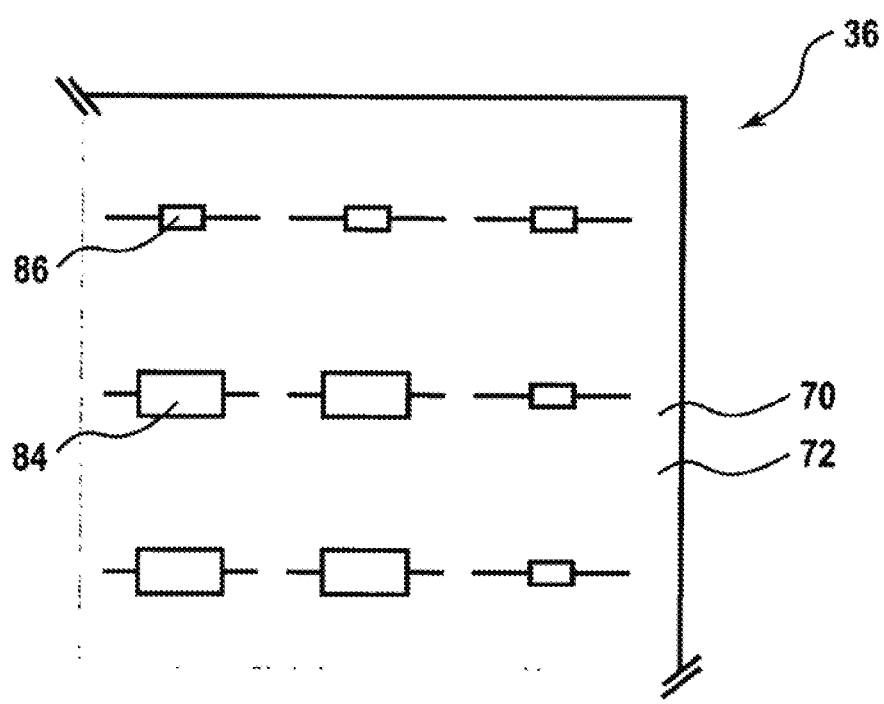
Figure 6:
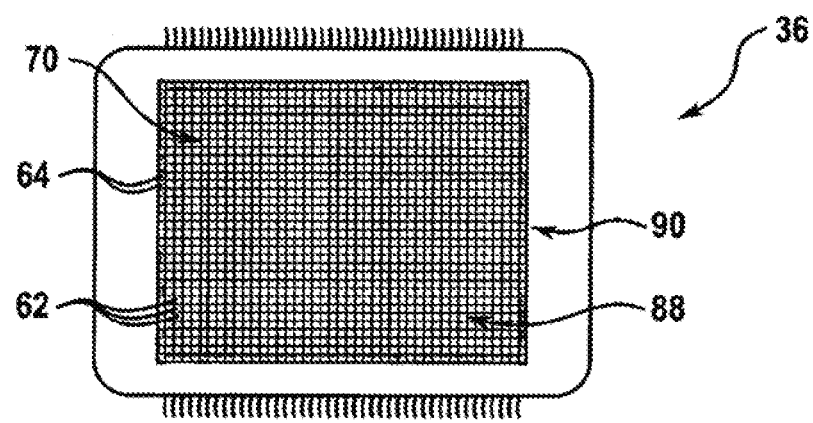
FIG. 6b shows schematic illustrations of arrangements of measurement pixels and reference pixels on the infrared detector array.
Figure 6:
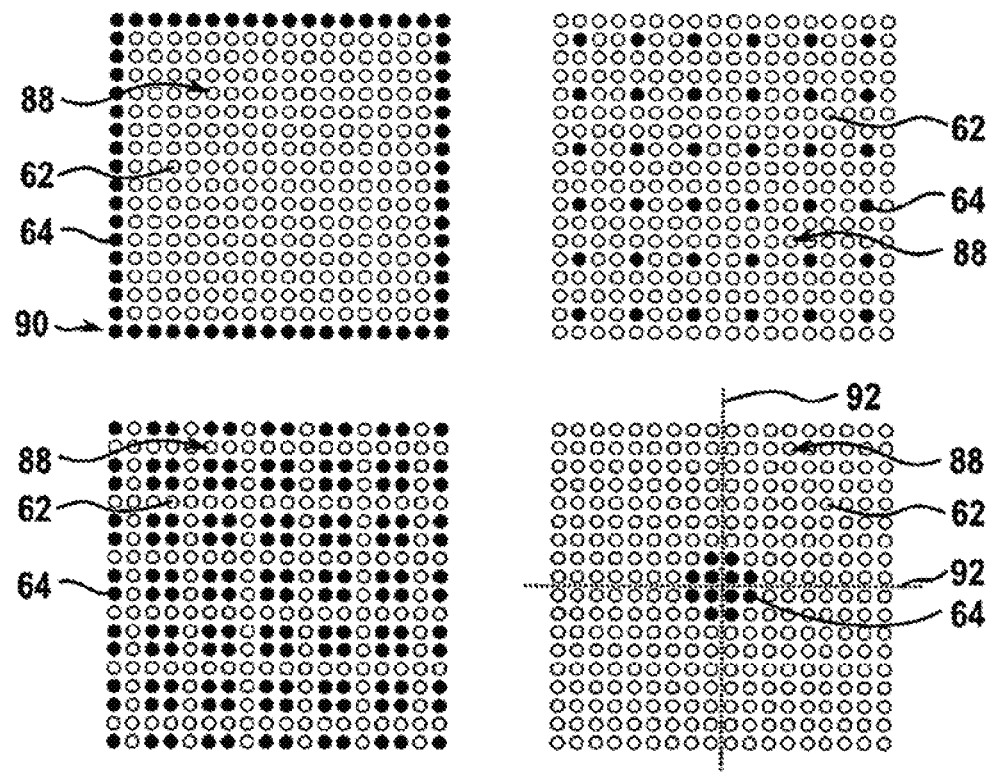

An entrance opening 28 in the housing 12 is provided on the side 26 of the housing 12 facing away from the user, thermal radiation emitted by the object 24, in particular emitted in a measurement, region 30 (see the dashed solid angle in FIG. 3) of a surface 22 of the object 24, being able to enter into the thermal imaging camera 10a through said entrance opening. A lens system 34 as an optical unit is situated directly behind the entrance opening 28 in a light tube 36 that reduces stray light. The lens system 34 is transmissive for radiation in the mid-wavelength infrared range and it serves to focus thermal radiation on an infrared detector array 36 (see, in particular, the explanations in relation to FIG. 5 and FIG. 6) of the thermal imaging camera 10a.

Further, a camera 38 operating in the visual spectrum, by means of which a visual image of the measurement region 30 is recorded, is provided on the side 26 of the housing 12 facing away from a user during the use of the thermal imaging camera 10a in one exemplary embodiment of the thermal imaging camera 10a. This visual image can be output together with a thermal image 40 that was generated by a temperature measurement initiated by the user, in particular output in a manner at least partly superposed or overlaid on the thermal image 40. By way of example, the camera 38 can be realized as a CCD image sensor.

On the lower side of the thermal imaging camera 10a, the handle 14 has a receptacle 42 for receiving an energy store 44 which, for example, may be embodied in the form of a rechargeable accumulator or in the form of batteries.

Figure 3:
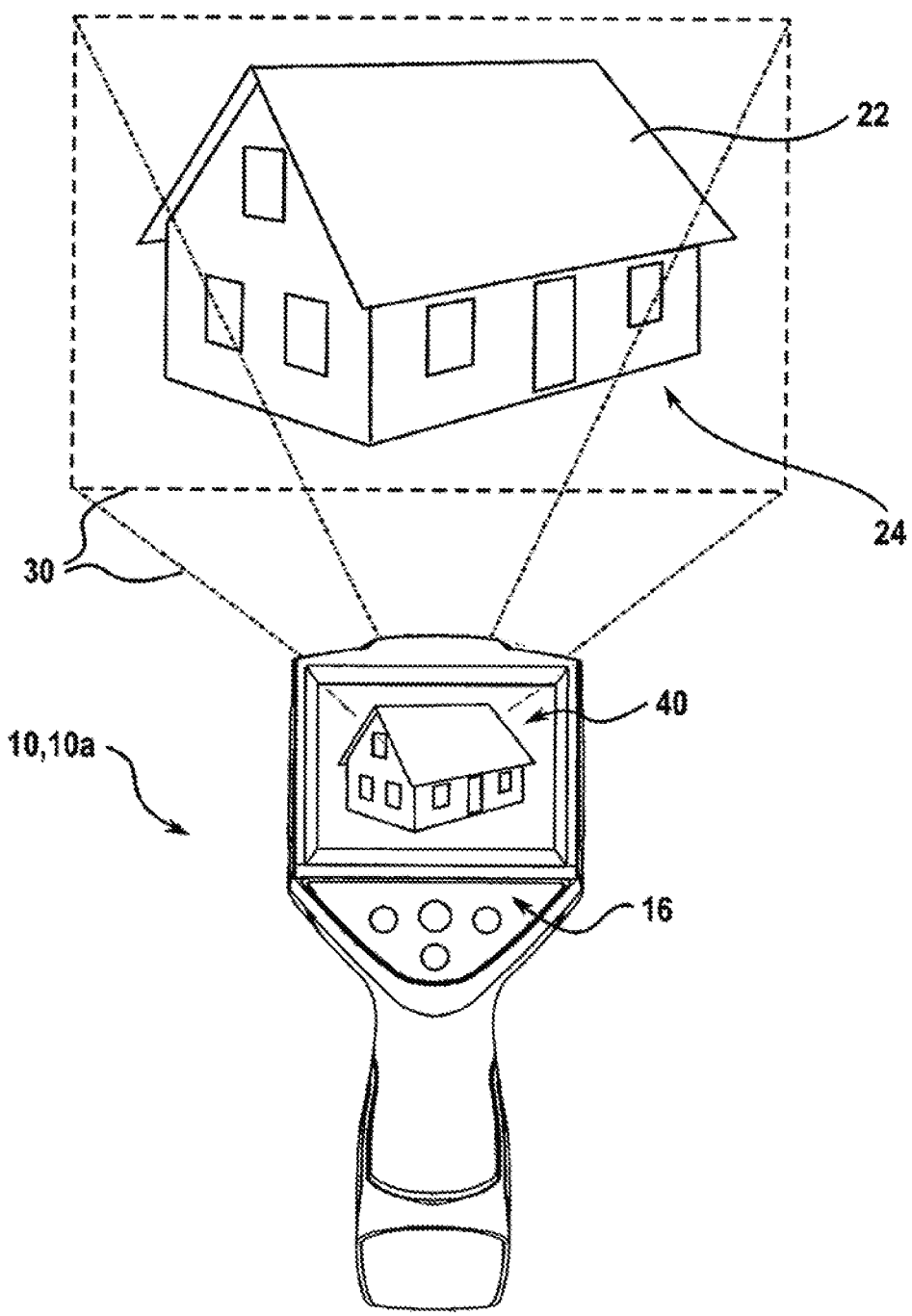
FIG. 3 shows a perspective, schematic rear view of the infrared measurement system according to the invention in front of an object to be measured.

The thermal imaging camera 10a serves to record a thermal image 40 of an object 24 to be examined, as illustrated schematically in FIG. 3. After activation of the thermal imaging camera 10a, the thermal imaging camera 10a contactlessly detects thermal radiation emitted from the surface 22 of the object 24 in the measurement region 30. The temperature established by the thermal imaging camera 10a characterizes the temperature of the surface 22 and should be understood to be a temperature distribution in this exemplary embodiment, said temperature distribution preferably being output in the form of a spatially resolved thermal image 40 to the user of the thermal imaging camera 10a. As a consequence of the trigger 20a being actuated by the user of the thermal imaging camera 10a, a thermal image 40 that is corrected by a temperature drift component $T_{drift}$ 46 is produced, output on the display 10 and stored in this exemplary embodiment.

Figure 4:
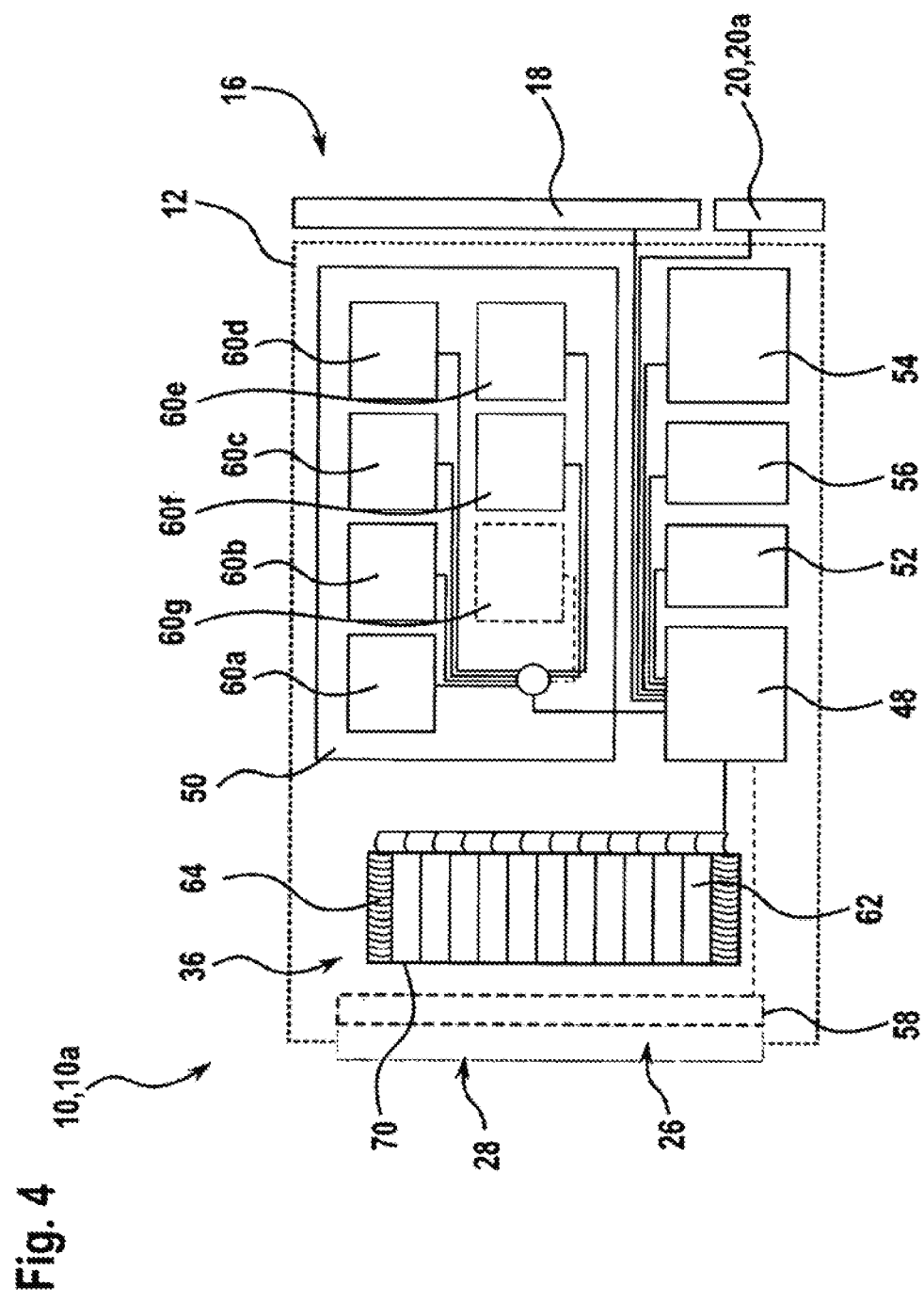
FIG. 4 shows a schematic illustration of the components of the infrared measurement system according to the invention that are required to carry out the method according to the invention.
Figure 7:
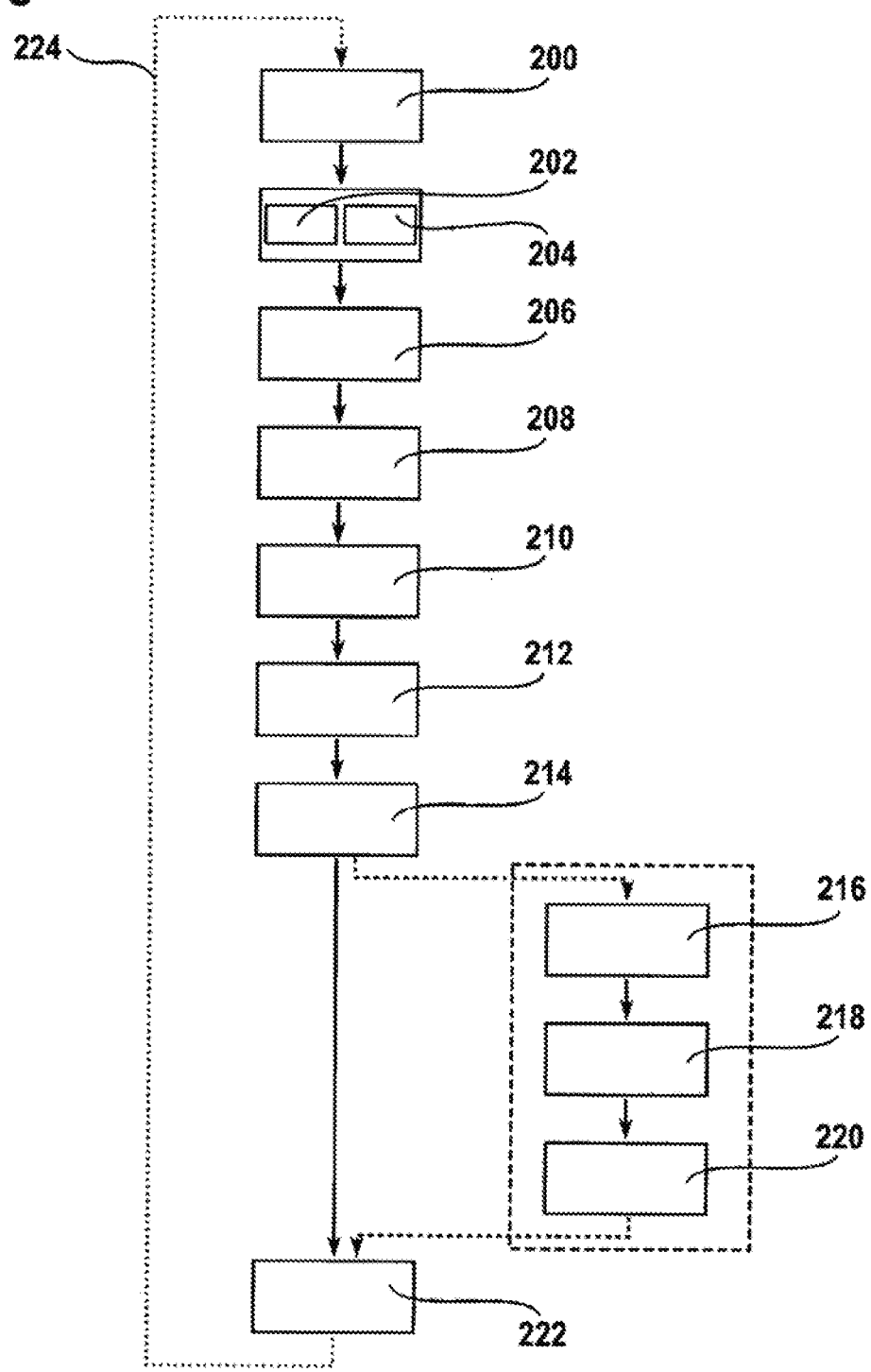
FIG. 7 shows an embodiment of the method according to the invention in a flowchart.
Figure 8:
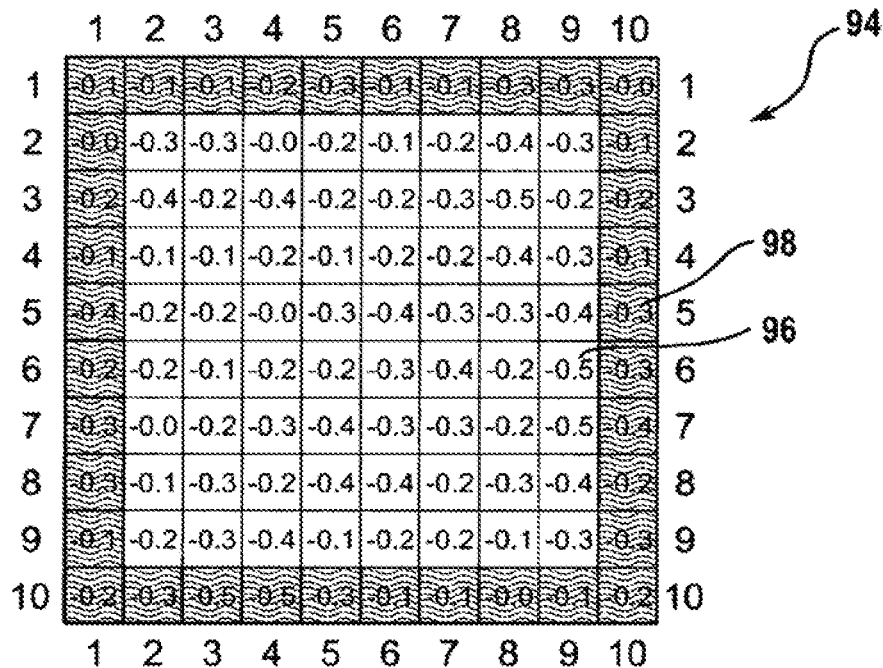
FIG. 8a shows an "initial offset map", which assigns initial measurement deviations $T_{BP,offset}$ and $T_{MP,offset}$ to reference pixels and measurement pixels, respectively, of the infrared detector array.
FIG. 8b shows an "initial drift susceptibility map", which assigns sensitivities of the initial measurement deviations a $\partial T_{BP,offset}$ and $\partial T_{MP,offset}$ to reference pixels and measurement pixels, respectively, of the infrared detector array.
Figure 8:
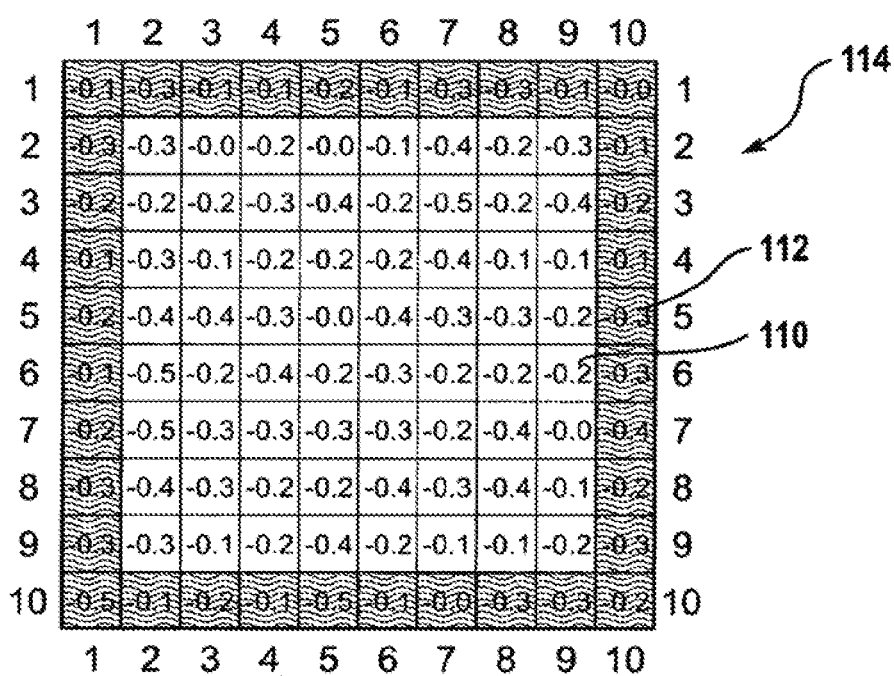

FIG. 4 schematically illustrates the components of the thermal imaging camera 10a according to the invention that are required to carry out the method according to the invention (see FIG. 7, in particular). These components are housed within the housing 12 of the thermal imaging camera 10a as electrical components and wired to one another. The components essentially comprise the infrared detector array 36, a control apparatus 48, an evaluation apparatus 50, a data communications interface 52, an energy supply apparatus 54 and a data memory 56.

In particular, the control apparatus 48 represents an apparatus which comprises at least one control electronics unit and means for communication with the other components of the thermal imaging camera 10a, in particular means for open-loop and closed-loop control of the thermal imaging camera 10a. The control apparatus 48 is provided to control the thermal imaging camera 10a and to facilitate the operation thereof. To this end, the control apparatus 48 is signal-connected to the other components of the measurement appliance, in particular the infrared detector array 36, the evaluation apparatus 50, the data communications interface 52, the energy supply apparatus 54, the data memory 56, and also the operating elements 20, 20a and the touch-sensitive display 18. In an alternative exemplary embodiment of the thermal imaging camera 10a, the control apparatus 48 is also connected to a closure mechanism 58 (illustrated using dashed lines here).

In FIG. 4, the energy supply apparatus 54 is preferably realized by the energy store 44 illustrated in FIG. 1 and FIG. 2.

Figure 9:
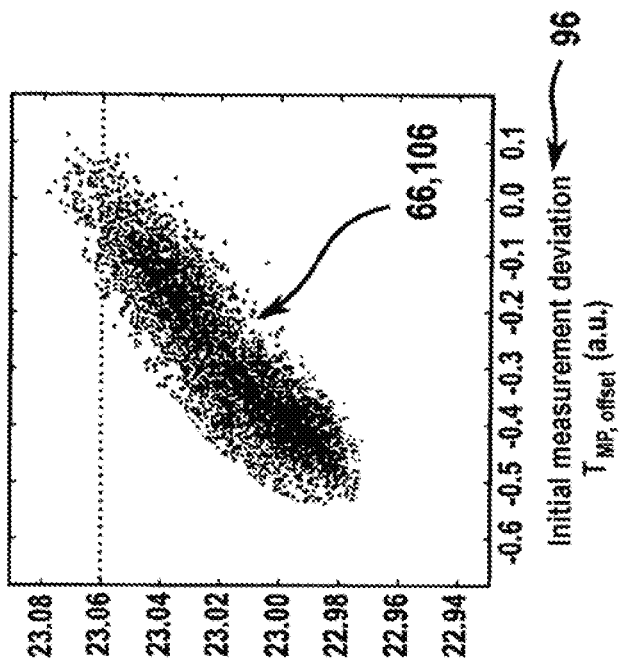
FIG. 9 shows a schematic illustration of the evaluation method steps according to the invention when using the initial measurement deviations $T_{BP,offset}$ and $T_{MP,offset}$ for determining the temperature drift components $T_{drift}$.
Figure 9:
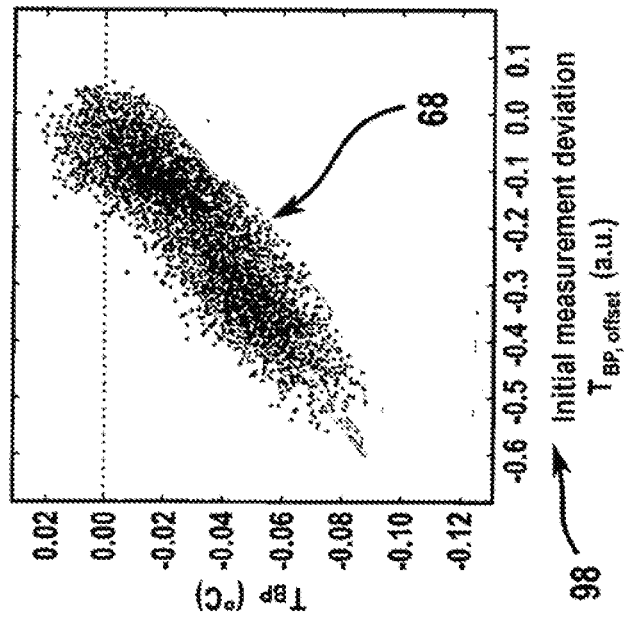
Figure 9:
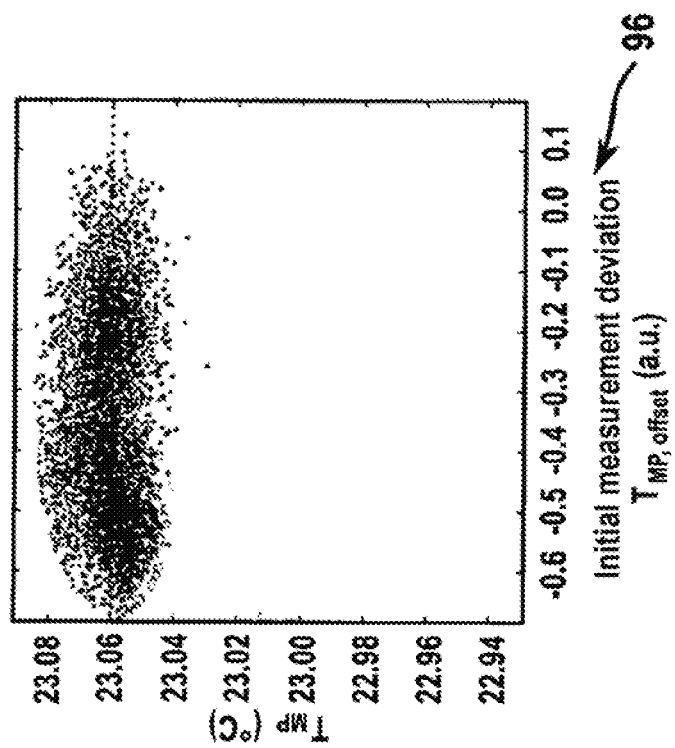
Figure 10:
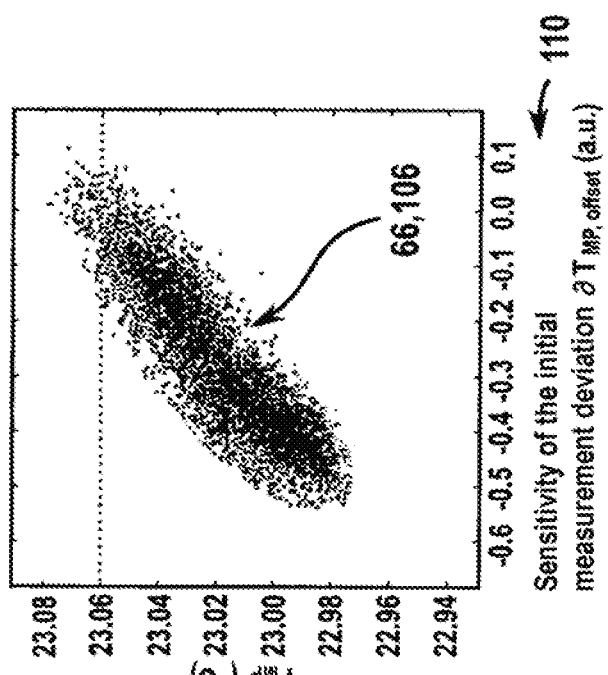
FIG. 10 shows a schematic illustration of the evaluation method steps according to the invention when using the initial drift susceptibilities $\partial T_{BP,offset}$ and $\partial T_{MP,offset}$ for determining the temperature drift components $T_{drift}$, FIGS. 11a,b show a schematic illustration of the evaluation method steps according to the invention for homogenizing temperature measurement values $T_{MP}$ (a) before homogenization and (b) after homogenization of the temperature measurement values $T_{MP}$.
Figure 10:
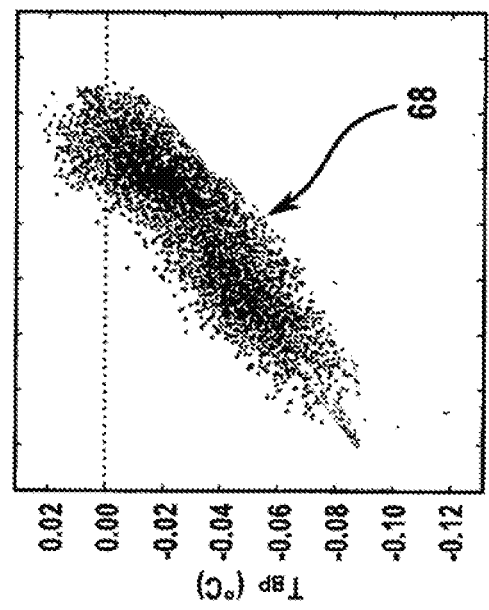
Figure 10:
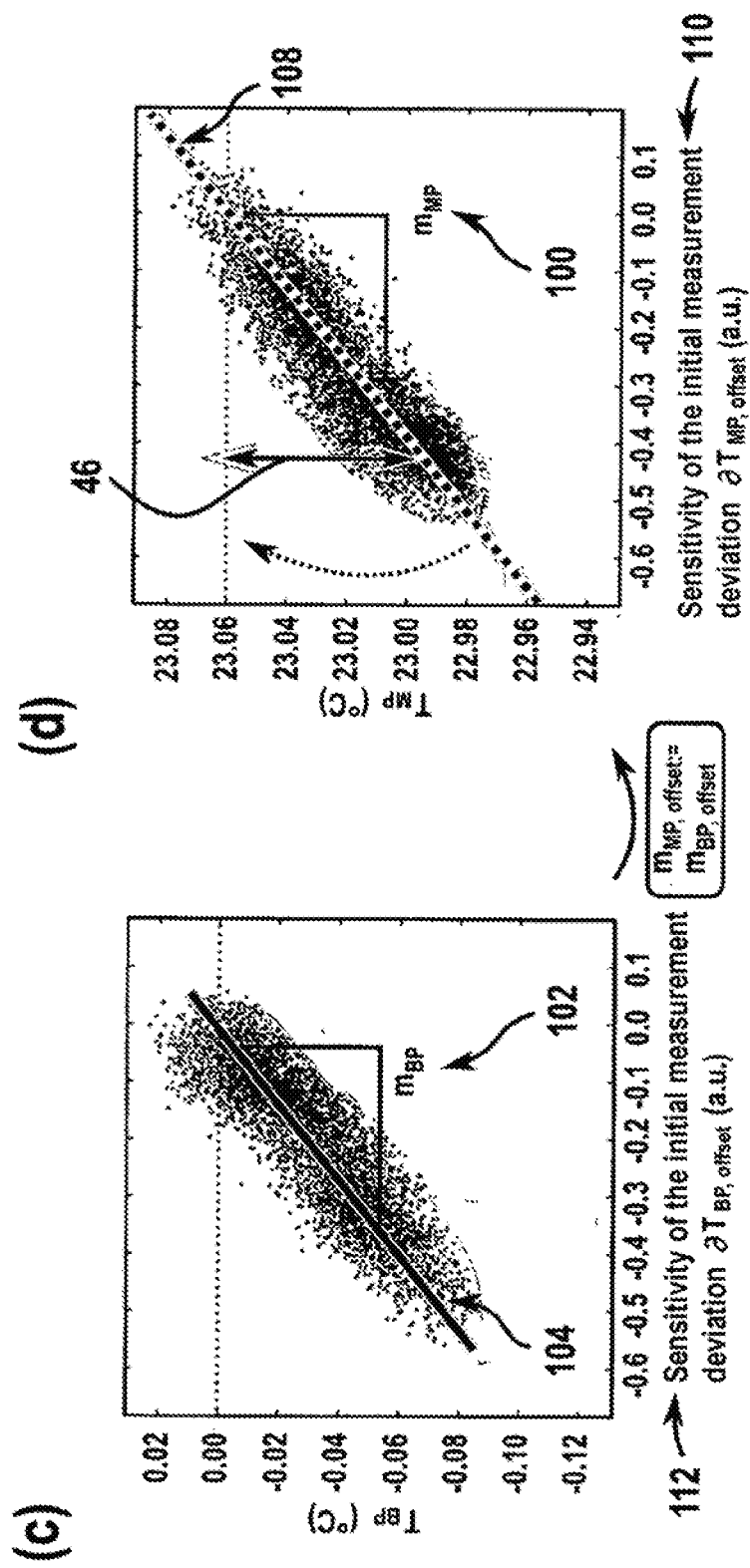
Figure 10:
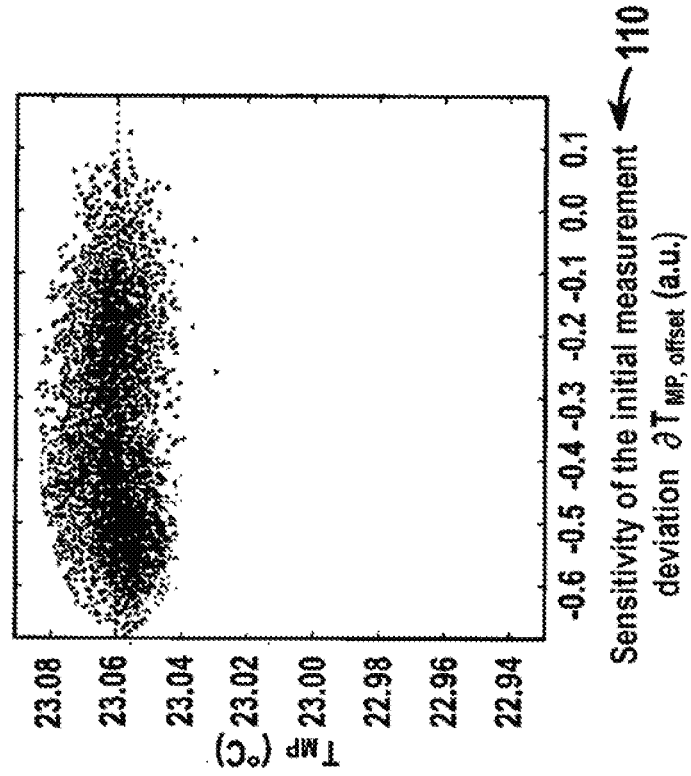

The evaluation apparatus 50 serves to receive and evaluate measurement signals of the infrared detector array 36 and has a plurality of functional blocks 60a-60g, which serve to process information, in particular to evaluate the received measurement signals. The evaluation apparatus 50 further comprises a processor, a memory and an operating program with evaluation and calculation routines (each not illustrated in any more detail). The evaluation apparatus 50 is provided to receive and evaluate (functional block 60a) measurement signals provided by the infrared detector array 36, in particular measurement signals provided by measurement pixels 62 and reference pixels 64 of the infrared detector array 36, which pixels are signal-connectable to the evaluation apparatus 50. In this way, temperature measurement values $T_{MP}$ (reference sign 66; see FIGS. 9 and 10, in particular) of a plurality of measurement pixels 62 and temperature measurement values $T_{BP}$ (reference sign 68; see FIGS. 9 and 10, in particular) of a multiplicity of reference pixels 64 are determined.

Further, the evaluation apparatus 50 is provided to correct temperature measurement values $T_{MP}$ 66 by pixel-associated temperature drift component $T_{drift}$ (reference sign 46; see FIGS. 9 and 10, in particular) in each case. This correction is carried out by functional block 60f. The pixel-associated temperature drift component $T_{drift}$ 46 is evaluated by functional blocks 60b to 60e. The method steps that are satisfied or worked through by functional blocks 60a-60f are described in detail in conjunction with FIGS. 7, 9 and 10.

Figure 11:
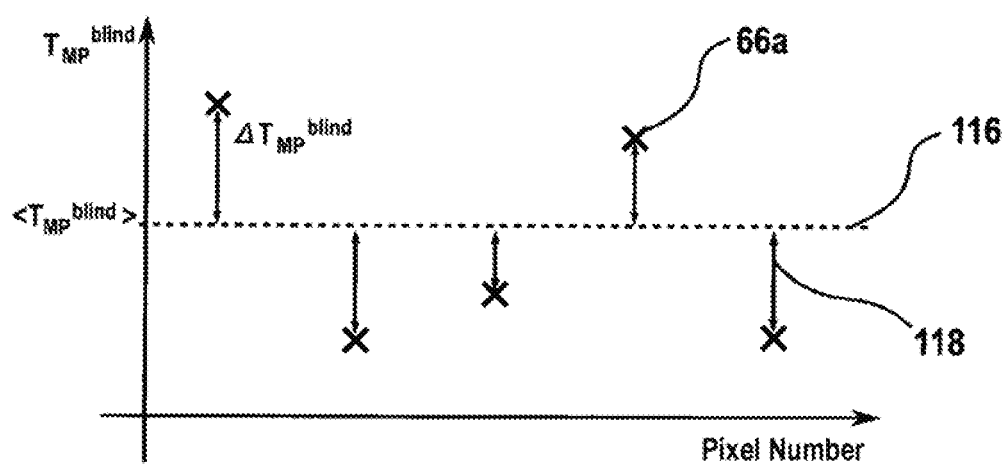
Figure 11:
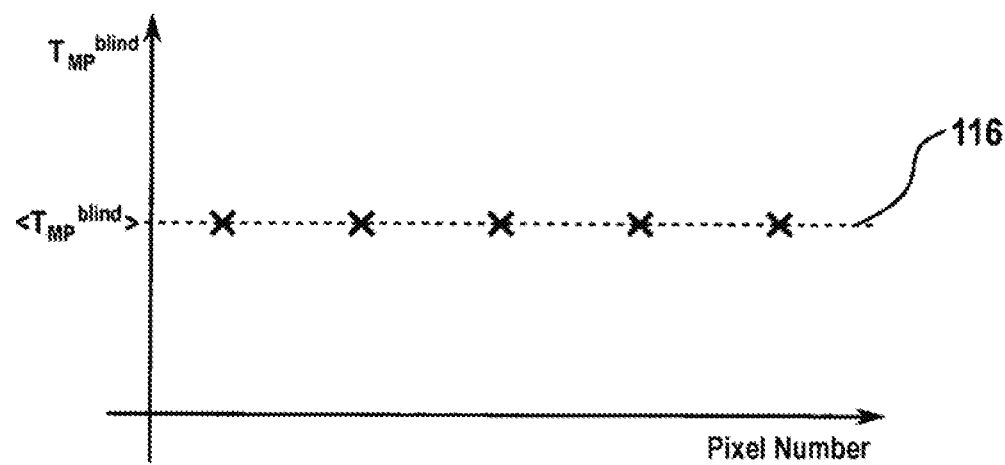

In the already mentioned alternative exemplary embodiment in which the thermal imaging camera 10a has a closure mechanism 58 (illustrated using dashed lines in FIG. 4), the evaluation apparatus 50 further has a functional block 60g (illustrated using dashed lines), which serves to homogenize or reduce the variance of the temperature measurement values $T_{MP}$ 66, which have already been corrected by the temperature drift component $T_{drift}$ 46 according to the method according to the invention. The functionality of this functional block 60g is described in detail in the explanation relating to FIG. 11.

Overall, the thermal imaging camera 10a, in particular the evaluation apparatus 50 thereof, is provided to carry out an evaluation of a thermal image 40 of the measurement region 30 on the basis of measurement signals from at least a plurality of measurement pixels 62 and reference pixels 64, with the thermal image 40 being corrected in respect of a pixel-associated temperature drift component $T_{drift}$ 46.

The temperature measurement values $T_{MP}$ 66 and $T_{BP}$ 68 evaluated by the evaluation apparatus 50, the pixel-associated temperature drift components $T_{drift}$ 46, the temperature measurement values $T_{MP}^{corr}$ corrected by the pixel-associated temperature drift components $T_{drift}$ 46 and thermal images composed from these data, in particular the thermal image 40 to be output, are provided to the control apparatus 48 by the evaluation apparatus 50 for further processing. In this way, there can be an output to a user of the thermal imaging camera 10a using the display 18 of the output apparatus. As an alternative or in addition thereto, the output can be implemented to an external data appliance (not illustrated in any more detail), such as, e.g., a smartphone, a computer or the like, using the data communications interface 52. Here, in the illustrated exemplary embodiment, the data communications interface 52 is embodied as a WLAN and/or Bluetooth interface. Moreover, an output to the data memory 56 for storing the established data and thermal images is conceivable.

The infrared detector array 36 of the thermal imaging camera 10a captures thermal radiation from the infrared radiation spectrum, which, emanating from the surface 22 of the object 24 to be examined in the measurement region 30, enters the entrance opening 28 of the thermal imaging camera 10a (see FIG. 3). The thermal radiation entering into the entrance opening 28 is focused onto the infrared detector array 36 by means of the lens system 34, with illumination of at least a plurality of measurement pixels 62 (not illustrated in any more detail here).

FIG. 5a shows a very much magnified, schematic plan view of part of an embodiment of the infrared detector array 36 having measurement pixels 62 and reference pixels 64. The plan view corresponds to the reproduction of an image of the surface 70 of the infrared detector array 36 obtained by means of scanning electron microscopy. The infrared detector array 36 consists of a semiconductor detector array substrate 72, which is made of silicon in this exemplary embodiment. Here, white surfaces represent the surface 70 of the infrared detector array 36, while the black regions reproduce depressions, in particular etched trenches 74 (see also FIG. 5b, in particular), into the detector array substrate 72. The infrared detector array 36 has a multiplicity of measurement pixels 62 and a plurality of reference pixels 64.

The measurement pixels 62 and the reference pixels 64 are each arranged on the surface 70 of the infrared detector array 36, which simultaneously forms the surface 70 of the detector array substrate 72. As illustrated in the schematic section through a measurement pixel 62 in FIG. 5b (nota bene: black does not represent depressions here like in FIG. 5a), the measurement pixels 62—and, analogously, the reference pixels 64 not illustrated in more detail in section here either—each have a recess 76 and a capture structure 78, formed from monocrystalline silicon, for capturing infrared radiation. The recess 76 forms a cavity behind the capture structure 78, i.e., the recess 76 isolates the capture structure 78 from the detector array substrate 72, and so the capture structure 78 is arranged at a distance from the detector array substrate 72. The measurement pixels 62 and the reference pixels 64 further have connection elements 80, 82, by means of which they are connected to the detector array substrate 72 and kept away from the latter (FIG. 5c). Consequently, the measurement pixels 62 and the reference pixels 64 are each arranged as isolated, in particular undercut, capture structures 78 on the surface 70 of the infrared detector array 36 facing the object 24 to be examined. Each measurement pixel 62 and each reference pixel 64 forms a p-n diode that is sensitive, in principle, to infrared light.

The measurement pixels 62 and the reference pixels 64 differ in terms of the connection to the detector array substrate 72. While the measurement pixels 62 are connected to the detector array substrate 72 using a few first connection elements 80, the reference pixels are connected to the detector array substrate 72 using many second connection elements 82. As shown in the magnified section of a part of FIG. 5a in FIG. 5c, the connection of the measurement pixels 62 in this exemplary embodiment is implemented by two first connection elements 80 with a length of 100 μm. By contrast, the reference pixels 64 are connected by twenty-four second connection elements 82 with a length of 10 μm. It should be noted that the two longer connection elements do not contribute significantly to the thermal conductivity since the latter is substantially determined by the substantially shorter connection elements 82.

The second effective cross-sectional area $A_{BP}$ of all second connection elements 82—i.e., the sum of the individual cross-sectional areas (reference sign 126) of the second connection elements 82—is thus realized to be ten times the first effective cross-sectional area $A_{MP}$ of all first connection elements 80—i.e., the sum of the cross-sectional areas (reference sign 124) of the first connection elements 80—(the same depth of the connection elements 80 and 82 is assumed).

Further, the first effective length $L_{MP}$ (reference sign 128) of each of the first connection elements 80 is realized to be ten times the second effective length $L_{BP}$ (reference sign 130) of each of the second connection elements 82. What this realizes is that each measurement pixel 62 is connected to the detector array substrate 72 with a first thermal conductivity $\lambda_{MP}$ 120, while each reference pixel 64 is connected to the detector array substrate 72 with a second thermal conductivity $\lambda_{BP}$ 122. The thermal conductivities of the corresponding connections are in each case denoted by arrows (reference signs 120 and 122) in FIG. 5d. In particular, what this realizes is that $A_{MP}/L_{MP}$ is very much smaller than $A_{BP}/L_{BP}$. Consequently, according to the proportionality (see explanations in relation to formula (1))

$$\lambda = \lambda_{spec.} \cdot A/L,$$

the first thermal conductivity $\lambda_{MP}$ 120 is smaller by at least a factor of 100 than the second thermal conductivity $\lambda_{BP}$ 122 in the illustrated exemplary embodiment.

On account of its mechanical connection via the connection elements 80 to the detector array substrate 72, each measurement pixel 62 is able to dissipate heat introduced by means of infrared radiation. The heat is dissipated to the detector array substrate 72 in the process. As a consequence of radiating-in infrared radiation $P_{MP}$, a respective measurement pixel 62 heats by $\Delta T_{MP}$, wherein an electric resistance of the measurement pixel 62 in relation to a current $I_{MP}$ flowing through the measurement pixels 62 changes on account of the heating. The first thermal conductivity $\lambda_{MP}$ 120, with which the measurement pixels 62 are connected to the detector array substrate 72, is selected here in such a way that the measurement pixels 62 have a high sensitivity to radiated-in infrared radiation. On the basis of a detected infrared radiation, preferably depending on a detected intensity of radiated-in infrared radiation, each measurement pixel 62 produces an electrical measurement signal $I_{MP}$, which correlates with the radiated-in thermal output of the infrared radiation $P_{MP}$ on the measurement pixel 62. In this exemplary embodiment, the current $I_{MP}$ represents the measurement signal of each measurement pixel, wherein the measurement signals of all measurement pixels 62 are provided independently of one another to the control apparatus 48. Alternatively, a voltage $U_{MP}$ could also be used as measurement signal. Each measurement signal provided by a measurement pixel 62 can be transmitted to the evaluation apparatus 50 of the infrared measurement system 10a for the purposes of establishing the respective temperature measurement value $T_{MP}$ 66, the latter being evaluated individually by said evaluation apparatus or in combination with other measurement signals of other measurement pixels 62.

Since the reference pixels 61 are connected to the detector array substrate 72 with the second thermal conductivity $\lambda_{BP}$ 122, which is one hundred times greater in this exemplary embodiment than the first thermal conductivity $\lambda_{MP}$ 120, the reference pixels 64—in comparison with the measurement pixels 62—are substantially insensitive to infrared radiation incident from the measurement region 30. Consequently, the reference pixels 64 can be considered to be "blind pixels". A heat flux dissipated from a respective reference pixel 64 to the detector array substrate 72 is therefore significantly larger than a heat flux dissipated from a measurement pixel 62 to the detector array substrate 72 on account of the thermal connection of the reference pixel 64. In a manner analogous to the measurement pixel 62, the reference pixel current $I_{BP}$ (alternatively the voltage $U_{BP}$) of each reference pixel 64 can be provided to the control apparatus 48 as a measurement signal and, for the purposes of establishing a temperature measurement value $T_{BP}$ 68, can be transmitted from said control apparatus to the evaluation apparatus 50 of the infrared measurement system 10a, by means of which it is evaluated—in a manner analogous to the measurement signals of the measurement pixels 62.

FIG. 5d reproduces an electrical equivalent circuit diagram for the infrared detector array 36 illustrated in FIG. 5a, in which resistors 84, 86, 87 of different dimensions—symbolized by different sizes of the resistors—represent the thermal conductivities $\lambda_{MP}$ and $\lambda_{BP}$, by means of which the measurement pixels 62 and the reference pixels 64 are connected to the detector array substrate 72. Here, the small resistors 86 (five piece) symbolize the large thermal conductivity $\lambda_{BP}$ 122 of the reference pixels 64, (i.e., low thermal resistance), while the larger resistors 84 (four piece) symbolize the small thermal conductivity $\lambda_{MP}$ 120 (i.e., high thermal resistance) of the measurement pixels 62.

FIG. 6a shows a schematic plan view of an embodiment of the infrared detector array 36 of the thermal imaging camera 10a according to the invention from the direction of view of the incident measurement radiation. In simplified fashion, each measurement pixel 62 and each reference pixel 64 is represented by a square. In an exemplary fashion, the plurality of measurement pixels 62 are arranged in a matrix-like fashion in the form of an array 88 on the surface 70 of the infrared detector array 36, in particular on the surface 70 of the detector array substrate 72. In this exemplary embodiment, the number of measurement pixels 62 is 41×31 in an exemplary fashion. Any other values are conceivable.

In principle, the arrangement of the reference pixels 64 on the detector array substrate 72 is arbitrary but may be advantageously distributed for realizing a temperature drift component $T_{drift}$ 46 that is uniformly determinable over the entire infrared detector array 36. FIG. 6b illustrates different patterns which represent exemplary arrangements of measurement pixels 62 and reference pixels 64 on the infrared detector array 36. As also shown in FIG. 6a, the array 88 of measurement pixels 62 can be surrounded, for example, in particular framed, by an arrangement 90 of reference pixels 64; see FIG. 6b, top left. In a further exemplary embodiment, the reference pixels 64 can be arranged in regular fashion in the array 88 of measurement pixels 62 (see FIG. 6b, pattern top right, bottom left, bottom right), preferably be arranged in symmetric fashion, particularly preferably arranged in symmetric fashion in relation to at least one main axis of symmetry 92 of the infrared detector array (see FIG. 6b, pattern bottom right).

The method according to the invention is described below on the basis of FIGS. 7 to 11.

FIG. 7 illustrates a flowchart which reproduces an embodiment of the method according to the invention for contactlessly establishing the temperature of the surface 22, in particular for contactlessly establishing a thermal image 40 of the surface 22. The method is provided to be operated by a thermal imaging camera 10a, as was presented in conjunction with FIGS. 1 to 6.

Proceeding from the measurement scenario illustrated in FIG. 3, a user of the thermal imaging camera 10a is interested in examining the temperature distribution on the surface 22 of an object 24. For the purposes of measuring the surface 22, the user directs the thermal imaging camera 10a onto the object 24 to be examined. In the meantime, the thermal imaging camera 10a continuously captures infrared radiation from the measurement region 30 by means of the infrared detector array 36 and, in the meantime, continuously displays a non-corrected thermal image on the display 18. In a first method step 200, the user actuates the trigger 20a of the thermal imaging camera 10a and thereby initiates the determination of the temperature drift components $T_{drift}$ 46 and the correction of the established temperature measurement values $T_{MP}$ 66 of the measurement pixels 62. In an alternative exemplary embodiment of the method, this initiation can be implemented in automated fashion, in particular repeated after a time interval or in virtually continuous fashion (see dashed arrow 224 in FIG. 7).

Subsequently, the control apparatus 48 transmits the measurement signals, provided by the infrared detector array 36 at the time of initiation, to the evaluation apparatus 50. In method step 202, the evaluation apparatus 50 determines the temperature measurement values $T_{BP}$ 68 of a plurality of reference pixels 64 from their measurement signals. At the same time (or else in succession in one alternative), the evaluation apparatus 50 determines the temperature measurement values $T_{MP}$ 66 of a plurality of measurement pixels 62 from their measurement signals in method step 204. In this exemplary embodiment, these temperature measurement values $T_{MP}$ are temperature measurement values to be corrected according to the method according to the invention. The temperature measurement values are determined from the measurement signals in functional block 60a of the evaluation apparatus 50; see FIG. 4. Here, the functional block 60a converts the respective measurement signals $I_{MP}$ and $I_{BP}$ into temperature measurement values $T_{MP}$ 66 and $T_{BP}$ 68.

Subsequently, the evaluation apparatus 50 loads an "initial offset map" 94, as illustrated in FIG. 8a, from the data memory 56. By means of the initial offset map 94, the evaluation apparatus 50 assigns unique initial measurement deviations $T_{BP,offset}$ 98 to the temperature measurement values $T_{BP}$ 68 of the plurality of reference pixels 64 (hatched in FIG. 8a) in method step 206. In FIG. 8a, the unique identification of the pixels is ensured in each case, for example, by way of the line and column number thereof. Here, the evaluation apparatus 50 forms value pairs ($T_{BP}$, $T_{BP,offset}$) for each reference pixel 64 to be evaluated by reading initial measurement deviations $T_{BP,offset}$ 98, assigned to the respective reference pixels 64, from the initial offset map 94. These value pairs can be presented vividly by plotting the established temperature measurement values $T_{BP}$ 68 on the ordinate axis against the initial measurement deviations $T_{BP,offset}$ 98 on the abscissa axis; see FIG. 9a. Method step 206 is carried out in functional block 60b of the evaluation apparatus 50; see FIG. 4.

Subsequently, the evaluation apparatus 50 calculates the temperature drift behavior $m_{BP}$ 102 of the reference pixels 64 in method step 208 from the temperature measurement values $T_{BP}$ 68 of the reference pixels 64 as a gradient of a straight line 104, which models the plotted value pairs particularly well; see FIG. 9c. By way of example, this straight line can be obtained by means of a least squares fit or the like in one embodiment of the method. In particular, the following general equation applies to this straight line 104:

$$T_{BP} = m_{BP} \cdot (T_{BP,offset}^0 - T_{BP,offset}),$$

where $T_{BP,offset}^0$ is the abscissa intercept and $m_{BP}$ 102 is the temperature drift behavior of the reference pixels 64 as a constant of proportionality. The temperature drift behavior $m_{BP}$ 102 of the reference pixels 64 is determined in functional block 60c of the evaluation apparatus 50; see FIG. 4.

In the method step 210, the evaluation apparatus 50 establishes a mathematical relationship between the temperature drift behavior $m_{MP}$ 100 of measurement pixels 62 and the temperature drift behavior $m_{BP}$ 102 of the reference pixels 64 for the purposes of determining the temperature drift components $T_{drift}$ 46. In the exemplary embodiment of the method illustrated in FIG. 9, the temperature drift behavior $m_{MP}$ 100 of the measurement pixels 62 is set to be equal to the temperature drift behavior $m_{BP}$ 102 of the reference pixels 64, i.e., $m_{MP} := m_{BP}$. Method step 210 is carried out in functional block 60d of the evaluation apparatus 50; see FIG. 4.

In method step 212, evaluation apparatus 50 determines the pixel-dependent temperature drift components $T_{drift}$ 46 from the temperature drift behavior $m_{MP}$ 100 of the measurement pixels 62. To this end, the evaluation apparatus 50 initially determines the associated initial measurement deviations $T_{MP,offset}$ 96 for each measurement pixel 62 to be evaluated—in this exemplary embodiment, these are those measurement pixels for which the temperature measurement values $T_{MP}$ were determined in method step 204—from the initial offset map 94 loaded in conjunction with method step 206 (see FIG. 8a; measurement pixels are illustrated in white therein). The temperature measurement values $T_{MP}$ 66 (ordinate) of a plurality of measurement pixels 62, which are plotted against the initial measurement deviations $T_{MP,offset}$ 96 (abscissa), are illustrated as a point cloud 106 in FIG. 9b. Thereupon, it is possible to calculate a temperature drift component $T_{drift}$ 46 belonging to a measurement pixel 62 as a product of the temperature drift behavior $m_{MP}$ 100 and the initial measurement deviation $T_{MP,offset}$ 96 belonging to the corresponding measurement pixel 62 according to the formula $$T_{drift} = m_{MP} \cdot (T_{MP,offset}^0 - T_{MP,offset}).$$

This is illustrated in FIG. 9d as the dashed, calculated straight line 108, along which the values for the temperature drift component $T_{drift}$ 46, which are dependent on the initial measurement deviation $T_{MP,offset}$ 96 (abscissa axis), lie. The pixel-dependent temperature drift behavior $T_{drift}$ 46 according to method step 212 is determined in functional block 60e of the evaluation apparatus 50; see FIG. 4.

Consequently, the evaluation apparatus 50 determines the temperature drift components $T_{drift}$ 46 from the temperature measurement values $T_{BP}$ 68 of the reference pixels 64 in method steps 206 to 212, using the functional blocks 60a to 60e of the evaluation apparatus 50.

In method step 214, there is the final correction of the temperature measurement values $T_{MP}$ 66 of the measurement pixels 62 by the temperature drift component $T_{drift}$ 46 determined for the respective measurement pixel 62 by subtracting the two values. According to the illustration in FIGS. 9d and 9e, the straight line 108 is subtracted from the values of the point cloud, and so this correction can be elucidated by rotating the point cloud representing the temperature measurement values $T_{MP}$ 66 of the measurement pixels 64 (left-hand arrow in FIG. 9d). Method step 214 is carried out in functional block 60f of the evaluation apparatus 50; see FIG. 4.

In an alternative or additional embodiment of the method, the "sensitivity of the initial measurement deviations $\partial T_{MP,offset}$ in relation to the influences of aging" 110 of the measurement pixels 62 and the "sensitivity of the initial measurement deviations $\partial T_{BP,offset}$ in relation to the influences of aging" 112 of the reference pixels 64 also can be used in place of the initial measurement deviations $T_{MP,offset}$ 96 and the initial measurement deviation $T_{BP,offset}$ 98. In a manner equivalent to the representations in FIG. 9 and in FIG. 7, the evaluation is then carried out in such a way that, for the purposes of determining the temperature drift components $T_{drift}$ 46, the temperature drift behavior $m_{BP}$ 102 of the reference pixels 64 is determined as a constant of proportionality between sensitivities of the initial measurement deviations $\partial T_{BP,offset}$ 112 of the reference pixels 64 and temperature measurement values $T_{BP}$ 68 (see the equivalence of FIG. 9 and FIG. 10 apart from the abscissa axis labels). Further, in a manner equivalent to FIG. 9d, the temperature drift components $T_{drift}$ 46 are determined from the temperature drift behavior $m_{MP}$ 100 by virtue of the temperature drift components $T_{drift}$ 46 of the respective measurement pixels 62 being calculated in the form of a function as a product of temperature drift behavior $m_{MP}$ 00 and sensitivities of the initial measurement deviations $\partial T_{MP,offset}$ 110 of the respective measurement pixels 62 (see the equivalence of FIG. 9d and FIG. 10d apart from the abscissa axis labels). In particular, this exemplary embodiment of the method according to the invention resorts to an "initial drift susceptibility map" 114 that is kept available in the data memory 56 (see FIG. 8b) In the manner equivalent to the method already described above, the evaluation apparatus 50 then assigns unique sensitivities of the initial measurement deviations $\partial T_{BP,offset}$ 112 to the temperature measurement values $T_{BP}$ 68 of the plurality of reference pixels 64 (illustrated in hatched fashion in FIG. 8b) using the initial drift susceptibility map 114 in a method step that is equivalent to method step 206.

In the already mentioned alternative exemplary embodiment, in which the thermal imaging camera 10a has a closure mechanism 58 (illustrated using dashed lines in FIG. 4), the temperature measurement values $T_{MP}$ 66 can be homogenized. In the exemplary embodiment of the method according to the invention, shown in FIG. 7, this homogenization can be carried out following the correction of the temperature measurement values $T_{MP}$ 66 of the measurement pixels 62 by the temperature drift component $T_{drift}$ 46, i.e., after method step 214. As an alternative or in addition thereto, the homogenization can also be implemented at any other time, for example prior to calculating the temperature drift component $T_{drift}$ 46, i.e., before method step 206.

Now, in method step 216, the incidence of infrared radiation on the infrared detector array 36 is initially suppressed by means of the closure mechanism 58 and the temperature measurement values $T_{MP}^{blind}$ 66a are read. In FIG. 11a, five temperature measurement values $T_{MP}^{blind}$ 66a are plotted in a diagram in exemplary fashion. Subsequently, a mean value $<T_{MP}^{blind}>$ 116 is calculated in method step 218 from these temperature measurement values $T_{MP}^{blind}$ 66a, said mean value coming very close to the temperature of the closure mechanism 58. Here, the actual temperature of the closure mechanism 58 is irrelevant. In FIG. 11a, the mean value $<T_{MP}^{blind}>$ 116 is illustrated as a dashed line. Now, calculating a pixel-dependent deviation $\Delta T_{MP}^{blind}$ 118 from the mean value $<T_{MP}^{blind}>$ 116 (small arrows in FIG. 11a) for the read measurement pixels 62 renders it possible to correct each measurement pixel 62 by precisely this deviation $\Delta T_{MP}^{blind}$ 118 in method step 220 by virtue of the correction values $\Delta T_{MP}^{blind}$ 118 being applied to the temperature measurement values $T_{MP}$ 66 and the temperature measurement values $T_{MP}$ 66 consequently being homogenized or fitted to the mean value $<T_{MP}^{blind}>$ 116. The latter is illustrated in FIG. 11b, in which the temperature measurement values $T_{MP}^{blind}$ 66a lie on the dashed line illustrating the mean value $<T_{MP}^{blind}>$ 116 after the homogenization was carried out.

Method steps 216 to 220 are carried out in functional block 60g of the evaluation apparatus 50; see FIG. 4.

Subsequently, in method step 222, the corrected and possibly homogenized thermal image 40 is output to the user of the thermal imaging camera 10a using the display 18.

The invention claimed is:

1. A method for contactlessly establishing a temperature of a surface via an infrared measurement system that includes an infrared detector array with (i) a detector array substrate, (ii) a plurality of measurement pixels, which are each connected to the detector array substrate with a first thermal conductivity, wherein the measurement pixels are sensitive to infrared radiation and each provide a first measurement signal for establishing a first temperature measurement value which is dependent on an intensity of the incident infrared radiation, and (iii) a plurality of reference pixels, which are each connected to the detector array substrate with a second thermal conductivity and which each provide a second measurement signal for establishing a second temperature measurement value, the method comprising:
 determining the second temperature measurement values indicated by the second measurement signals from the plurality of reference pixels using an evaluation apparatus of the infrared measurement system;
 determining pixel-associated temperature drift components for the plurality of reference pixels with reference to the second temperature measurement values using the evaluation apparatus;
 determining the first temperature measurement values indicated by the first measurement signals from the plurality of measurement pixels using the evaluation apparatus, the first temperature measurement values being indicative of a temperature of the surface; and
 correcting the first temperature measurement values with the pixel-associated temperature drift components using the evaluation apparatus,
 wherein the reference pixels are configured as blind pixels that are substantially insensitive to infrared radiation, and wherein the second thermal conductivity is greater than the first thermal conductivity.

2. The method as claimed in claim 1, wherein the temperature drift components are determined repeatedly at time intervals.

3. The method as claimed in claim 1, wherein a temperature drift behavior of the reference pixels is determined from the second temperature measurement values of the reference pixels, and wherein the temperature drift components are determined as a function of the temperature drift behavior.

4. The method as claimed in claim 3, wherein the temperature drift behavior of the reference pixels is determined as a constant of proportionality between initial measurement deviations of the reference pixels and the second temperature measurement values of the reference pixels for determining the temperature drift components.

5. The method as claimed in claim 3, wherein the temperature drift behavior of the reference pixels is determined as a constant of proportionality between sensitivities of the initial measurement deviations in relation to the influences of aging of the reference pixels and the second temperature measurement values of the reference pixels for determining the temperature drift components.

6. The method as claimed in claim 3, wherein a mathematical relationship is established between a temperature drift behavior of measurement pixels and a temperature drift behavior of reference pixels for determining the temperature drift components, and the temperature drift behavior of measurement pixels is determined from the mathematical relationship.

7. The method as claimed in claim 6, wherein the temperature drift behavior of the measurement pixels is set equal to the temperature drift behavior of the reference pixels.

8. The method as claimed in claim 6, wherein the temperature drift components are determined from the temperature drift behavior by virtue of the temperature drift components of the respective measurement pixels being calculated in the form of a function as a product of temperature drift behavior and initial measurement deviations of the respective measurement pixels.

9. The method as claimed in claim 6, wherein the temperature drift components are determined from the temperature drift behavior by virtue of the temperature drift components of the respective measurement pixels being calculated in the form of a function as a product of the temperature drift behavior and influences of aging of the respective measurement pixels.

10. The method as claimed in claim 1, further comprising:
 suppressing an incidence of infrared radiation onto the infrared detector array by a closure mechanism of the infrared measurement system; and
 correcting each of the first temperature measurement values by a pixel-dependent deviation from a mean value of the second temperature measurement values measured in the case of a suppressed incidence of infrared radiation.

11. An infrared measurement system for contactlessly establishing a temperature distribution on a surface, comprising:
 an evaluation apparatus; and
 at least one infrared detector array that includes:
 a detector array substrate,
 a plurality of measurement pixels, which are each connected to the detector array substrate with a first thermal conductivity, wherein the measurement pixels are sensitive to infrared radiation and each provide a first measurement signal configured to establish a first temperature measurement value $T_{MP}$ which is dependent on an intensity of the incident infrared radiation, and a plurality of reference pixels, which are each connected to the detector array substrate with a second thermal conductivity and which each provide a second measurement signal configured to establish a second temperature measurement value, wherein the reference pixels are configured as blind pixels that are substantially insensitive to infrared radiation, and wherein the second thermal conductivity is greater than the first thermal conductivity, wherein the evaluation apparatus is configured to:
  determine the second temperature measurement values indicated by the second measurement signals from the plurality of reference pixels,
  determine pixel-associated temperature drift components for the plurality of reference pixels with reference to the second temperature measurement values,
  determine the first temperature measurement values indicated by the first measurement signals from the plurality of measurement pixels, the first temperature measurement values being indicative of the temperature of the surface, and
  correct the first temperature measurement values based on the pixel-associated temperature drift components.

12. The method as claimed in claim 1, further comprising:
determining a temperature distribution on the surface based on the corrected first temperature measurement values, and
wherein the infrared measurement system is configured as a handheld thermal imaging camera.

13. The method as claimed in claim 1, wherein the temperature drift components are determined continuously.

14. The infrared measurement system as claimed in claim 11, wherein an arrangement of reference pixels on the infrared detector array surrounds an array of measurement pixels arranged of the infrared detector array.

15. The infrared measurement system as claimed in claim 11, wherein the reference pixels are arranged in an array of measurement pixels arranged on the infrared detector array.

16. The infrared measurement system as claimed in claim 11, wherein the first thermal conductivity is less than the second thermal conductivity by a factor of 10.

17. The infrared measurement system as claimed in claim 11, wherein:
  the first thermal conductivity is configured by a first effective cross-sectional area and a first effective length of first connection elements, by way of which the measurement pixels are connected to the detector array substrate,
  the second thermal conductivity is configured by a second effective cross-sectional area and a second effective length of second connection elements, by way of which the reference pixels are connected to the detector array substrate, and
  one or more of the first effective cross-sectional area of the first connection elements differs from the second effective cross-sectional area of the second connection elements and the first effective length of the first connection elements differs from the second effective length of the second connection elements such that the first effective cross-sectional area divided by the first effective length does not equal the second effective cross-sectional area divided by the second effective length.

18. The infrared measurement system as claimed in claim 17, wherein on or more of (i) the second effective cross-sectional area of the second connecting elements is configured as a multiple of the first effective cross-sectional area of the first connecting elements and (ii) the first effective length of the first connection elements is configured as a multiple of the second effective length of the second connection elements.

19. The infrared measurement system as claimed in claim 18, wherein the first thermal conductivity is configured by first connection elements of at least 100 μm length and the second thermal conductivity is configured by second connection elements of at most 10 μm length.

* * * * *